United States Patent [19]

Craport et al.

[11] Patent Number: 5,961,572
[45] Date of Patent: Oct. 5, 1999

[54] SYSTEM AND METHOD FOR IDENTIFYING THE GEOGRAPHIC REGION OF A GEOGRAPHIC AREA WHICH CONTAINS A GEOGRAPHIC POINT ASSOCIATED WITH A LOCATION

[75] Inventors: William N. Craport, Norcross; Bruce C. Winters, Lawrenceville, both of Ga.

[73] Assignee: Bellsouth Intellectual Property Corporation, Wilmington, Del.

[21] Appl. No.: 08/831,023

[22] Filed: Apr. 1, 1997

[51] Int. Cl.⁶ ........................................ G06G 7/78
[52] U.S. Cl. ........................ 701/207; 701/208; 701/202; 702/150; 342/457; 342/357; 340/990; 340/995
[58] Field of Search .................... 701/200, 207, 701/208, 209, 210, 211, 201, 202; 340/988, 990, 995; 73/178 R; 342/451, 452, 457, 357; 702/150; 455/422, 429

[56] References Cited

U.S. PATENT DOCUMENTS

| | | | |
|---|---|---|---|
| 4,675,823 | 6/1987 | Noland | 701/300 |
| 4,809,201 | 2/1989 | Keklak | 345/435 |
| 4,888,698 | 12/1989 | Driessen et al. | 701/200 |
| 5,231,584 | 7/1993 | Nimura et al. | 701/202 |
| 5,428,546 | 6/1995 | Shah et al. | 701/207 |
| 5,445,524 | 8/1995 | Jones | 434/153 |
| 5,506,897 | 4/1996 | Moore et al. | 379/220 |
| 5,533,107 | 7/1996 | Irwin et al. | 379/201 |
| 5,550,743 | 8/1996 | Kyrtsos | 701/213 |
| 5,581,259 | 12/1996 | Schipper | 342/451 |
| 5,594,650 | 1/1997 | Shah et al. | 701/207 |
| 5,636,122 | 6/1997 | Shah et al. | 701/207 |
| 5,669,061 | 9/1997 | Schipper | 455/429 |
| 5,684,940 | 11/1997 | Freeman et al. | 395/138 |
| 5,754,671 | 5/1998 | Higgins et al. | 382/101 |
| 5,758,313 | 5/1998 | Shah et al. | 701/208 |
| 5,796,634 | 8/1998 | Craport et al. | 702/150 |

*Primary Examiner*—Jacques H. Louis-Jacques
*Attorney, Agent, or Firm*—Jones & Askew, LLP

[57] ABSTRACT

A system and method for identifying the geographic region of a geographic area which contains a geographic point associated with a location. A description of a location such as an address, a nearby intersection, or a nearby landmark, is used to determine geographic coordinates for a geographic point associated with the location. To identify the geographic region which contains the geographic point, one of the plurality of geographic regions in a geographic area is selected as a selected region and a determination is made as to whether the geographic point is located within the selected region. If the geographic point is located within the selected region, then the geographic region is identified. Different preferred methods correspond to different methods for making a determination as to whether the geographic point is located within the selected region. In the preferred methods, the determination is made by drawing a line of predetermined slope through the geographic point and through the selected region and comparing the geographic point to the intersection points between the line and the boundary of the selected region. Some of the preferred methods use estimated geographic regions.

51 Claims, 12 Drawing Sheets

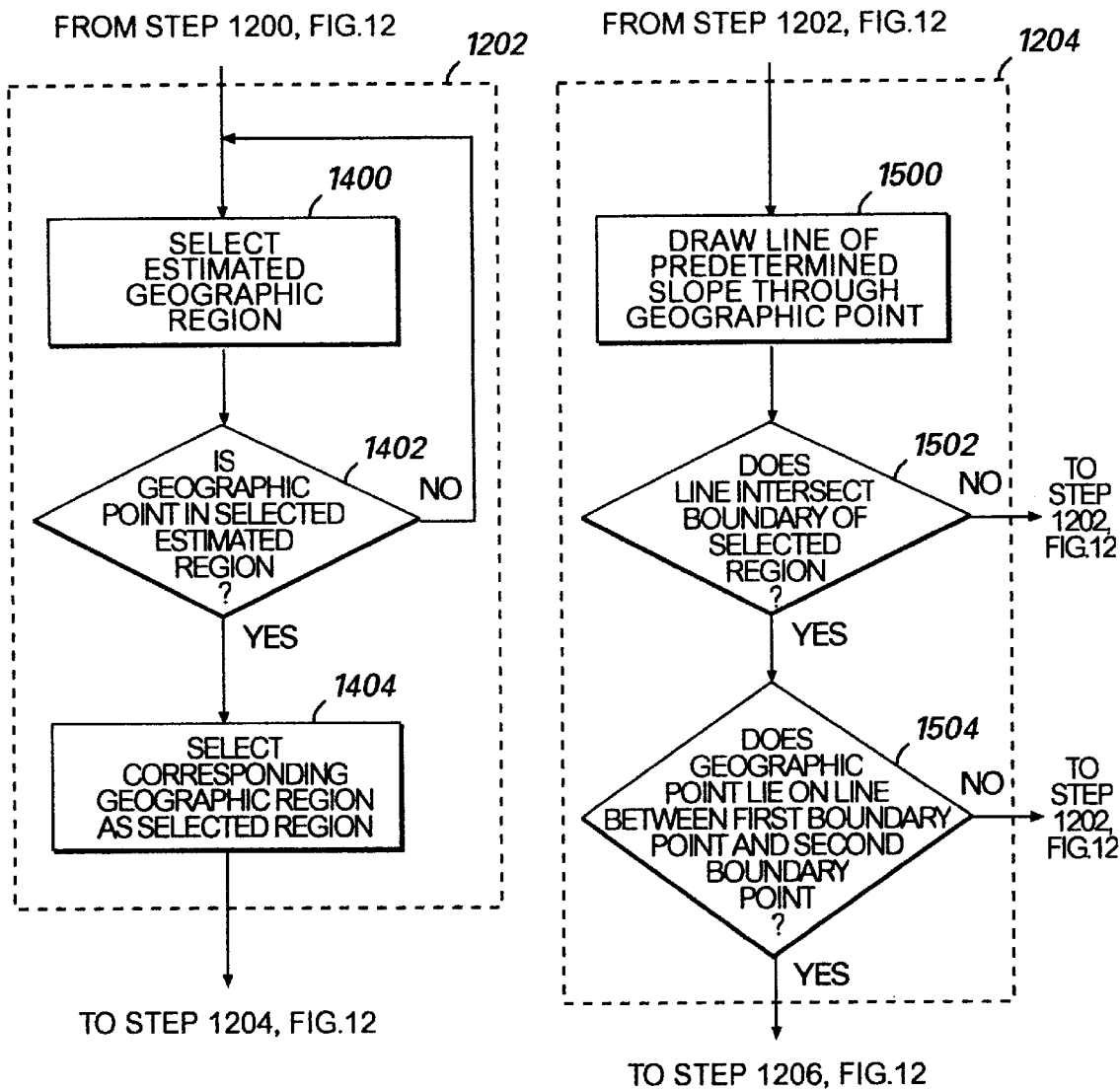
FIG. 14     FIG. 15

SYSTEM AND METHOD FOR IDENTIFYING THE GEOGRAPHIC REGION OF A GEOGRAPHIC AREA WHICH CONTAINS A GEOGRAPHIC POINT ASSOCIATED WITH A LOCATION

FIELD OF THE INVENTION

This invention relates in general to the field of geographic coding and in particular to a system and method for identifying the geographic region of a geographic area which contains a geographic point associated with a location.

BACKGROUND OF THE INVENTION

A number of wireless devices have been developed to meet the needs of an increasingly mobile society. Devices such as telephones which were once hard-wired to a single location are now portable. Traditionally, when a customer requested telephone service, the customer was assigned a telephone number that was operable from a fixed location such as the customer's home or office. However, when a wireless customer requests service, the wireless customer is assigned a number which is operable over a large geographic area.

Wireless service is available virtually throughout the United States. The geographic area of the United States has been divided into geographic regions commonly referred to as Basic Trading Areas ("BTA's") by Rand McNally & Company. The Federal Communications Commission ("FCC") uses the BTA's to define wireless coverage areas throughout the United States. The FCC issues a license for each BTA to permit a wireless service provider to operate within a specified frequency block within the BTA. A license permits a single service provider to operate within the BTA's frequency block and to serve wireless customers with billing addresses within the BTA. A single service provider may hold multiple licenses and may operate in multiple BTA's.

The wireless service provider for a particular BTA determines the calling features or services offered to customers within the BTA. Different service providers may offer different services and even the same service provider may offer different services in different BTA's. Not only may the services differ from BTA to BTA, but the tax rate for wireless service may differ from BTA to BTA.

To apply the proper tax rate to the customer's bill, the BTA which contains the customer's address must be identified. The BTA could be identified manually by a customer service representative or by a computer program using some type of lookup table or map. However, in either case there is room for error. If the address supplied by the customer is in error or is incorrectly recorded by the customer service representative, the correct BTA will not be identified. In addition to the possibility of human error, if the address is in a new development and is not yet included in the table or map, a BTA will not be identified. Thus, there is a need for a reliable method for identifying the BTA which contains a customer's address.

Once the correct BTA is identified, a BTA identifier may be included in the customer's file. The service provider may use the BTA identifiers to determine customers with billing addresses located in a selected BTA. If a service provider intends to offer additional calling features to customers in a selected BTA, those customers in the BTA can be targeted to receive information regarding the additional features.

In addition to relating a customer's billing address to a BTA, relating a customer's operating location to a BTA or other geographic region is also useful. When a customer reports a problem it is helpful to identify the BTA in which the customer was located when the problem occurred. If a customer reported that a calling feature was inoperable, it would be helpful to know whether the customer was in a BTA where the feature was offered when the problem occurred. It is also useful to relate a customer's operating location to a geographic region defined by the operating range of an antenna or other piece of equipment. By monitoring the locations of customer problems, a service provider may become aware of developing trends and may be able to take preventive action. For example, the occurrence of a number of problems in close proximity to an antenna or other piece of equipment may indicate an equipment problem.

To relate a customer's billing address or operating location to a BTA or other geographic region, the operating location and the geographic region may be geographically encoded or geocoded. To geocode an address or operating location, the address or description of the operating location is converted into longitude and latitude. A geocoder is a program module which converts a street address into longitude and latitude. An example of a geocoder is P.A.C.E. (Probabalistic Address Coding Engine) from Matchware Technologies, Inc., 15212 Dino Drive, Burtonsville, Md. 20866. To geocode a region, the boundary points of the region are converted into a plurality of longitudinal and latitudinal coordinates. Libraries of geocoded data are available which contain longitude and latitude for street addresses and for geographic regions such as BTA's or zip code zones. Examples of geocoded data libraries include Dynamap/2000 Street Network File from Geographic Data Technologies, 11 Lafayette Street, Labanon, N.H. 03766 and BTA/MTA Boundaries U.S. from MapInfo Corp., One Global View, Troy, N.Y. 12180. Once a location and a region are described by longitude and latitude, a comparison may be made between the longitude and latitude for the location, and the longitude and latitude for the region to determine whether the location is located within the geographic region.

Longitude and latitude for a location may be obtained for a street address using a geocoder such as P.A.C.E. However, there may be times when a street address is unavailable. For example, in a wireless environment, a customer may not know the street address for a location where the customer experienced a problem because the customer may be operating the wireless device in an unfamiliar location when the problem occurs. Without a street address, a conventional geocoder may be unable to resolve the customer's location into longitude and latitude. Although the customer may be unable to provide a complete street address for the location, the customer may be able to provide a description of a nearby location such as an intersection or a landmark. If the customer can provide a description of a nearby intersection or landmark, then longitude and latitude for the intersection or landmark may be obtained. The longitude and latitude for the nearby intersection or landmark are used to approximate the customer's location and may be used to identify the BTA which contains the customer's location.

There may be times when an address cannot be resolved into longitude and latitude. For example, if the customer provides a street address, but the street address is incorrect, then a geocoder may be unable to identify longitude and latitude for the address. If the determination that an address cannot be resolved into longitude and latitude can be made in real time, the determination would be more useful. For example, if the determination that the address cannot be resolved into longitude and latitude can be made while the customer is still available, then the customer can immediately correct or supplement the address. The customer may be able to correct an incorrect address or to supplement the address provided with a description of a nearby intersection or a landmark.

Once longitude and latitude for a location or for a point approximating the location is identified, then the BTA or other geographic region which contains the location may be identified. If the identification of the geographic region which contains the location is made in real time, the identification is more useful. In the account activation example, if the address provided by the customer is resolved into longitude and latitude, but does not identify a BTA served by the wireless service provider, then there is probably an error in the address. If the identification of the BTA which contains the address can be made while the customer is still available, then the customer can immediately correct or supplement the address. In the case of problem reporting, if the BTA or other geographic region which contains the problem location can be determined quickly, the problem is more likely to be resolved during the initial problem report, eliminating the need for a subsequent customer call-back. Real time determination also provides valuable information for system analysis and resource allocation.

Accordingly, in the field of geographic coding, there is a need for a system and method for identifying geographic coordinates for a location or for a geographic point approximating the location in real time.

There is also a need for a system and method for identifying the geographic region of a geographic area which contains a geographic point.

There is an additional need for a system and method for identifying the geographic region of a geographic area which contains the geographic point in real time.

SUMMARY OF THE INVENTION

The present invention provides a system and method for identifying the geographic region of a geographic area which contains a geographic point associated with a location. To implement this system and method, longitude and latitude for the location or for a geographic point associated with the location are obtained. The location may be described by a street address. Alternatively, the location may be approximated by a nearby geographic point such as an intersection or landmark. The longitude and latitude for the location or for a point approximating the location define a geographic point and are used to identify the geographic region of a geographic area which contains the location.

The geographic area is divided into a plurality of non-overlapping geographic regions. To identify the geographic region which contains a geographic point, generally one of the geographic regions is selected as a selected region. A determination is made as to whether the geographic point is located within the selected region. If the determination is that the geographic point is located within the selected region, then the selected region is identified.

Advantageously, the present invention provides a system and method for the identification of the geographic region which contains a geographic point associated with a location in real time. Real time identification is very useful. In systems using geographic coding, real time identification of the geographic region which contains a geographic point associated with a location provides valuable information for system analysis and resource allocation. Real time determination also provides early detection of errors in location or geographic point information. The failure to identify longitude and latitude for a street address indicates that the street address is incorrect. Similarly, the failure to identify a geographic region that contains a geographic point when the geographic point is located within that geographic area indicates that the geographic point information is erroneous. If the error can be detected in real time, it is easier to obtain corrected or supplemental information.

Preferred Method for Identifying a Geographic Point Associated with a Location

The present invention provides a preferred method for identifying a geographic point associated with a location. A geographic point is defined by geographic coordinates such as longitude and latitude. To identify a geographic point associated with a location, an address, including a zip code is received for a location. An address match candidate corresponding to a first geographic point is also received. The address match candidate is used to make an address determination as to whether the address match candidate is associated with the location.

If the address determination is that the address match candidate is not associated with the location, then an intersection and an intersection match candidate are received. The intersection match candidate corresponds to a second geographic point. The intersection match candidate is used to make an intersection determination as to whether the intersection match candidate is associated with the location.

If the intersection determination is that the intersection match candidate is not associated with the location, then a landmark is received. In addition to the landmark, a landmark match candidate is received. The landmark match candidate corresponds to a third geographic point and is used to make a landmark determination. The landmark determination determines whether the landmark match candidate is associated with the location. If the landmark determination is that the landmark match candidate is not associated with the location, then geographic coordinates for a fourth geographic point associated with the zip code are identified. Preferably, the geographic coordinates for the centroid of the geographic region defined by the zip code are identified.

If the address determination is that the address match candidate is associated with the location, then preferably, the geographic coordinates for the first geographic point are identified. If the intersection determination is that the intersection match candidate is associated with the location, then preferably, the geographic coordinates for the second geographic point are identified. If the landmark determination is that the landmark match candidate is associated with the location, then preferably, the geographic coordinates for the third geographic point are identified.

Alternatively, geographic coordinates for a geographic point associated with an address may be identified without using an intersection or landmark. To identify geographic coordinates for a geographic point associated with an address, an address, including a street number is received. The address is used to make an address match candidate determination as to whether there is an address match candidate associated with the address. An address match candidate corresponds to a first geographic point.

If the address match candidate determination is that there is an address match candidate associated with the address, then preferably, an address determination is made. If the address match candidate determination is that there is no address match candidate associated with the address, then the street number is deleted from the address to create a modified address. A modified address match candidate corresponding to a second geographic point is received. The modified address match candidate is used to make a modified address determination as to whether the modified address match candidate is associated with the location.

If the modified address determination is that the modified address is not associated with the location, then preferably, geographic coordinates for a third geographic point associated with the zip code for the address are identified. If the modified address determination is that the modified address match candidate is associated with the location, then the geographic coordinates for the second geographic point are identified.

Preferred Methods for Identifying the Geographic Region Which Contains a Geographic Point The present invention also provides several preferred methods for identifying the geographic region of a geographic area which contains a geographic point associated with a location. The preferred methods may be divided into two groups. One group of preferred methods uses estimated geographic regions to identify the geographic region of a geographic area which contains a geographic point associated with a location. The other group of preferred methods does not use estimated geographic regions. An estimated geographic region approximates or estimates the general size of a geographic region by a regularly-shaped estimated geographic region. A description of the group of preferred methods which does not use estimated geographic regions is presented first.

Boundary Point Pair Method

In one of the preferred methods which does not use estimated geographic regions, one of the plurality of non-overlapping geographic regions is selected as a selected region. The selected region is used to make a determination as to whether the geographic point is located within the selected region. The determination is made by drawing a line of predetermined slope through the geographic point and through the selected region so that the line intersects the boundary of the selected region at a first boundary point and at a second boundary point. If the geographic point lies on the line between the first boundary point and the second boundary point, then the determination is that the geographic point is located within the selected region.

If the determination is that the geographic point is located within the selected region, the selected region is identified. If each geographic region has a name, then the step of identifying the selected region may include identifying the selected region by the name of the selected region.

If the geographic point does not lie on the line between the first boundary point and the second boundary point, then preferably the determination is that the geographic point is not located within the selected region. Once a determination is made that the geographic point is not located within the selected region, then preferably another one of the geographic regions is selected as the selected region and a determination is made as to whether the geographic point is located within that selected region. These steps are repeated until the determination as to whether the geographic point is located within the selected region is that the geographic point is located within the selected region.

Single Boundary Point Method

In another one of the preferred methods to identify the geographic region which contains a geographic point, one of the plurality of non-overlapping geographic regions is selected as a selected region. A determination is made as to whether the geographic point is located within the selected region. The determination is made by drawing a line of predetermined slope through the geographic point and through the selected region. If the line intersects the boundary of the selected region at the geographic point, then the determination is that the geographic point is located within the selected region and the selected region is identified. If each geographic region has a name, then the step of identifying the selected region preferably includes identifying the selected region by the name of the selected region.

In the Single Boundary Point Method, the line may intersect the boundary of the selected region only at the geographic point. If the line intersects the boundary of the selected region only at the geographic point, then preferably the determination is that the geographic point is located within the selected region.

If the determination is that the geographic point is not located within the selected region, then preferably another one of the geographic regions is selected as the selected region and a determination is made as to whether the geographic point is located within that selected region. These steps are repeated until the determination as to whether the geographic point is located within the selected region is that the geographic point is located within the selected region.

Preferred Methods for Identifying Geographic Region which Contains a Geographic Point Using Estimated Geographic Regions In another group of preferred methods for identifying the geographic region which contains a geographic point, estimated geographic regions are used. An estimated geographic region corresponds to a geographic region and generally approximates or estimates the geographic region with a regularly-shaped estimated geographic region which totally encompasses the corresponding geographic region. This group of preferred methods is similar to the group of preferred methods described above, except that a determination is made as to whether the geographic point is located within a selected estimated region. If the determination is that the geographic point is located within the selected estimated region, then the geographic region corresponding to the selected estimated region is selected as the selected region.

Boundary Point Pair Method Using Estimated Geographic Regions

In one of the preferred methods to identify the geographic region which contains a geographic point using estimated geographic regions, the geographic area is divided into a plurality of non-overlapping geographic regions. Each geographic region has a respective estimated geographic region. One of the plurality of estimated geographic regions is selected as the selected estimated region and a first determination is made as to whether the geographic point is located within the selected estimated region. If the first determination is that the geographic point is located within the selected estimated region, then the geographic region which corresponds to the selected estimated region is selected as the selected region.

A second determination is made as to whether the geographic point is located within the selected region. The second determination is made by drawing a line of predetermined slope through the geographic point and through the selected region so that the line intersects the boundary of the selected region at a first boundary point and at a second boundary point. The second determination also includes checking whether the geographic point lies on the line between the first boundary point and the second boundary point. If the geographic point lies on the line between the first boundary point and the second boundary point, then the determination is that the geographic point is located within the selected region. If the second determination is that the geographic point is located within the selected region, then the selected region is identified. If each geographic region has a name, then the step of identifying the selected region preferably includes identifying the selected region by the name of the selected region.

If the second determination is that the geographic point is not located within the selected region, then preferably the step of selecting one of the estimated geographic regions, the step of making a first determination as to whether the geographic point is located within the selected estimated region, and the step of making a second determination as to whether the geographic point is located within the selected region are repeated until the geographic point is located within the selected region. The selected region is then identified.

If the first determination is that the geographic point is not located within the selected estimated region, then preferably the step of selecting one of the estimated geographic regions and the step of making a first determination as to whether the geographic point is located within the selected estimated region are repeated.

In the preferred method using estimated geographic regions just described, the step of dividing the geographic area into a plurality of non-overlapping geographic regions, each of the geographic regions having a respective estimated geographic region, preferably uses estimated geographic regions which totally encompass the geographic regions.

Single Boundary Point Method Using Estimated Geographic Regions

Another of the preferred methods to identify the geographic region which contains a geographic point uses estimated geographic regions. Per this method, the geographic area is divided into a plurality of non-overlapping geographic regions, each geographic region having a respective estimated geographic region. One of the plurality of estimated geographic regions is selected as the selected estimated region and a first determination is made as to whether the geographic point is located within the selected estimated region. If the first determination is that the geographic point is located within the selected estimated region, then the geographic region which corresponds to the selected estimated region is selected as the selected region.

After the selected region is selected, a second determination is made as to whether the geographic point is located within the selected region. The second determination is made by drawing a line of predetermined slope through the geographic point and through the selected region. If the line intersects the boundary of the selected region at the geographic point, then the second determination is that the geographic point is located within the selected region. If the second determination is that the geographic point is located within the selected region then the selected region is identified. If each geographic region has a name, then the step of identifying the selected region preferably includes identifying the selected region by the name of the selected region.

In this method, the line may intersect the boundary of the selected region only at the geographic point. If the line intersects the boundary of the selected region only at the geographic point, then preferably the second determination is that the geographic point is located within the selected region.

If the second determination is that the geographic point is not located within the selected region, then the step of selecting one of the estimated geographic regions, the step of making a first determination as to whether the geographic point is located within the selected estimated region, and the step of making a second determination as to whether the geographic point is located within the selected region are repeated until the geographic point is located within the selected region. The selected region is then identified.

If the first determination is that the geographic point is not located within the selected estimated region, then preferably the step of selecting one of the estimated geographic regions and the step of making a first determination as to whether the geographic point is located within the selected estimated region are repeated.

In this preferred method, preferably, estimated geographic regions which totally encompass the geographic regions are used in the step of dividing the geographic area into a plurality of non-overlapping geographic regions, each geographic region having a respective estimated geographic region.

System for Identifying the Geographic Region Which Contains a Geographic Point Associated with a Location The preferred system for identifying the geographic region which contains a geographic point associated with a location utilizes a computer-readable medium which stores a computer program. The computer program includes instructions for identifying geographic coordinates for a geographic point associated with a location. To identify geographic coordinates for a geographic point associated with a location, the computer program receives an address for the location, including a street number and a zip code. The address is used to make an address match candidate determination as to whether there is an address match candidate associated with the address. If the address match candidate determination is that there is no address match candidate associated with the address, then the street number is deleted from the address to create a modified address. A modified address match candidate corresponding to a second geographic point is received. The modified address match candidate is used to make a modified address determination as to whether the modified address match candidate is associated with the location.

If the modified address determination is that the modified address match candidate is not associated with the location, then an intersection and an intersection match candidate are received. The intersection match candidate corresponds to a third geographic point. The intersection match candidate is used to make an intersection determination as to whether the intersection match candidate is associated with the location. If the intersection determination is that the intersection match candidate is not associated with the location, then a landmark is received. A landmark match candidate is also received. The landmark match candidate corresponds to a fourth geographic point. The landmark match candidate is used to make a landmark determination as to whether the landmark match candidate is associated with the location. If the landmark determination is that the landmark match candidate is not associated with the location, then the geographic coordinates for a fifth geographic point associated with the zip code of the address are identified. Preferably, the fifth geographic point corresponds to the centroid of the zip code zone defined by the zip code.

If the address match candidate determination is that there is an address match candidate associated with the address, then an address match candidate is received. The address match candidate is used to make an address determination as to whether the address match candidate is associated with the location. Preferably, the step of making an address determination includes receiving an address probability. The address probability is the probability that the address match candidate is associated with the address. The address probability is compared with a predetermined address probability threshold. If the address probability does not meet the predetermined address probability threshold, then the address determination is that the address match candidate is not associated with the location.

The computer program also includes instructions to identify the geographic region of a geographic area which contains a geographic point. To identify the geographic region which contains a geographic point, the computer program divides the geographic area into a plurality of non-overlapping geographic regions. One of the plurality of non-overlapping geographic regions is selected as the selected region and a determination as to whether the geographic point is located within the selected region is made. The determination as to whether the geographic point is located within the selected region is made by drawing a line of predetermined slope through the geographic point and through the selected region such that the line intersects the boundary of the selected region at a first boundary point and at a second boundary point. The determination includes checking whether the geographic point lies on the line between the first boundary point and the second boundary point. If the geographic point lies on the line between the first boundary point and the second boundary point, the determination is that the geographic point is located within the selected region and the selected region is identified. If each geographic region has a name, then the step of identifying the selected region preferably includes identifying the selected region by the name of the selected region. However, if the geographic point does not lie on the line between the first boundary point and the second boundary point, the determination is that the geographic point is not located within the selected region.

If the determination is that the geographic point is not located within the selected region, then preferably the step of selecting one of the plurality of non-overlapping geographic regions as the selected region and the step of making a determination as to whether the geographic point is located within the selected region are repeated until the determination is that the geographic point is located within the selected region. Once the geographic point is located within the selected region, the selected region may be identified.

A computer program stored on a computer-readable medium may include instructions for identifying the geographic region of a geographic area which contains a geographic point associated with the location. To identify the geographic region, the computer program includes instructions to receive an address for the location. The address is used to make an address determination as to whether the address is associated with an address match candidate. An address match candidate corresponds to a first geographic point. If the address determination is that the address is associated with the address match candidate, then the first geographic point is selected as the selected geographic point.

If the address determination is that the address is not associated with the address match candidate, then an intersection and an intersection match candidate are received. The intersection match candidate corresponds to a second geographic point. The intersection match candidate is used to make an intersection determination as to whether the intersection match candidate is associated with the location. If the intersection determination is that the intersection match candidate is not associated with the location, then a landmark is received. A landmark match candidate is also received. The landmark match candidate is used to make a landmark determination as to whether the landmark match candidate is associated with the location. If the landmark determination is that the landmark match candidate is not associated with the location, then a geographic point associated with the zip code is selected as the selected geographic point.

Once a geographic point is selected as a selected geographic point, the geographic region containing the selected geographic point is identified. The geographic region is identified by selecting one of the plurality of non-overlapping geographic regions as a selected region. A determination is made as to whether the selected geographic point is located within the selected region by drawing a line of predetermined slope through the selected geographic point and through the selected region so that the line intersects a first boundary point and a second boundary point of the selected region. The determination includes checking whether the selected geographic point lies on the line between the first boundary point and the second boundary point. If the selected geographic point lies on the line between the first boundary point and the second boundary point, then the determination is that the selected geographic point is located within the selected region. If the determination is that the selected geographic point is located within the selected region, then the computer program identifies the selected region.

Accordingly, it is an object of the present invention to provide a system and method for identifying geographic coordinates for a location or for a geographic point approximating the location in real time.

It is also an object of the present invention to provide a system and method for identifying the geographic region of a geographic area which contains a geographic point.

It is an additional object of the present invention to provide a system and method for identifying the geographic region which contains a geographic point in real time.

BRIEF DESCRIPTION OF THE DRAWINGS

FIG. 14 is a flow diagram illustrating one of the preferred methods for selecting a geographic region.

FIG. 15 is a flow diagram illustrating one of the preferred methods for determining whether a geographic point is located within a selected region.

DETAILED DESCRIPTION

Figure 1:
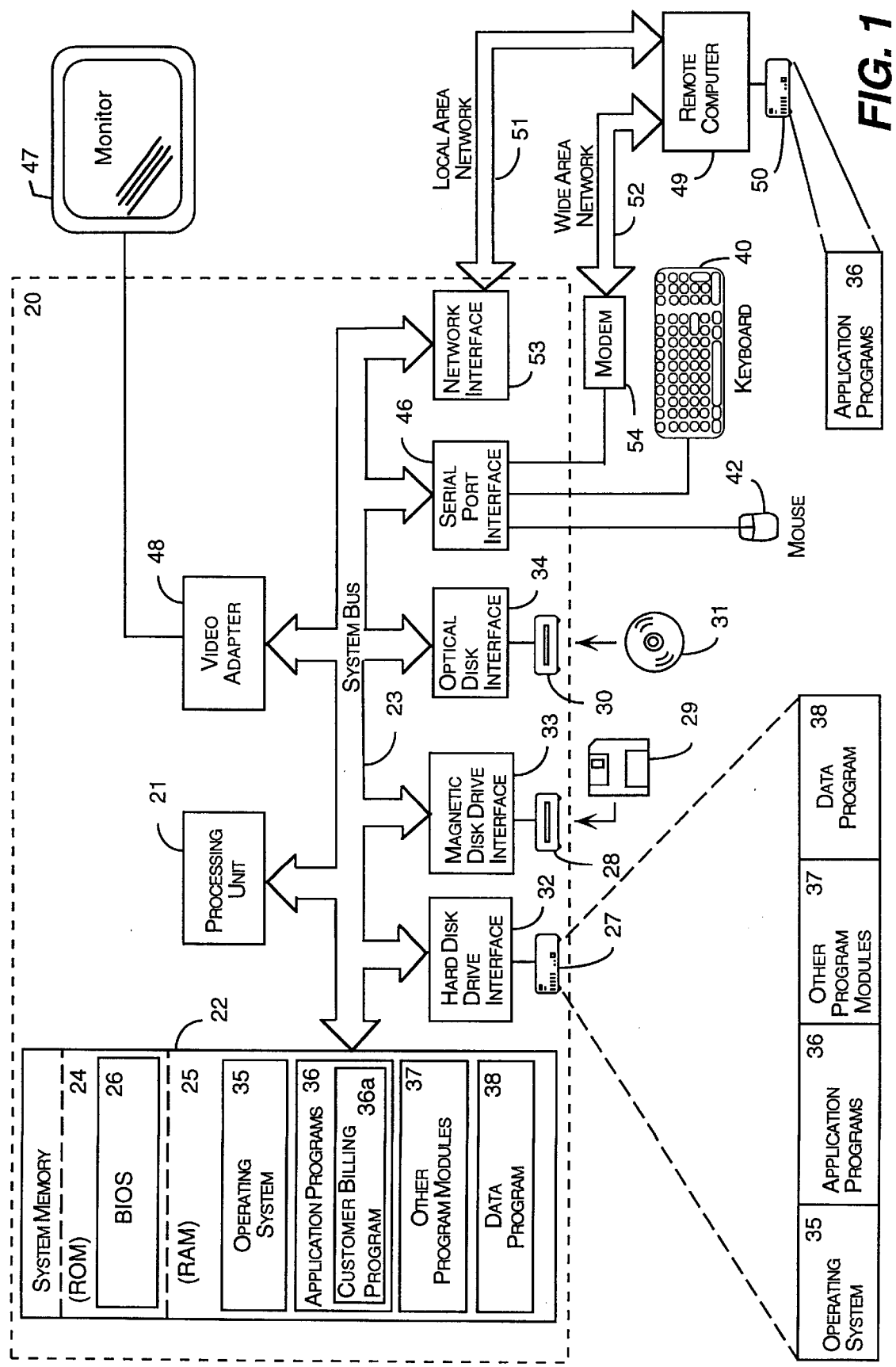
FIG. 1 is a block diagram of a personal computer that provides an exemplary operating environment for the preferred embodiments of the present invention.

The present invention is directed to a system and method for identifying the geographic region of a geographic area which contains a geographic point associated with a location. The particular embodiments described herein are intended in all respects to be illustrative rather than restrictive. Alternative embodiments will become apparent to those skilled in the art to which the present invention pertains without departing from its spirit and scope.

Preferably, the present invention is implemented with a computer system. The figures included herein may appear (completely or in part) on a computer screen as part of a graphical user interface ("GUI") for interaction with a user. However, the preferred methods described herein do not require that any of the figures appear to the user. Nonetheless, the figures and accompanying detailed description provide an explanation of the steps of the preferred methods of the present invention. These steps may be carried out by the computer system through operations and programming that will be well-known to those skilled in the art.

Application of Invention by Wireless Service Provider

A representative application of the present invention is its use by a wireless service provider in the areas of customer billing and customer service trouble tracking. In the area of customer billing, the present invention may be used by a wireless service provider to identify the BTA which contains a customer's address. When a customer activates a wireless device, the customer provides the service provider with a street address for the delivery of the customer's bills. The present invention may be used to geocode the address and to identify the BTA which contains the customer's address. The BTA which contains the customer's address may be identified by a BTA name or BTA number. Once the BTA that contains the customer's address is identified, a BTA identifier may be placed in the customer's account file so that any BTA specific charges or rates such as taxes will be properly reflected in the customer's account. In the customer billing application, a map or other graphical representation of the geographic area, geographic regions or the geographic point may not be displayed to the customer service representative.

In the area of customer service trouble tracking, a wireless service provider may use the present invention to geocode a location where a problem occurred. Geocoding problems helps a service provider focus on problem activity within a particular area. Once a customer provides the service provider with the location where a problem occurred, the location may be geocoded and may be displayed on a map of the area. By monitoring the locations of customer problems, a service provider may become aware of developing trends and may be able to take preventive action. For example, the occurrence of a number of problems in close proximity to an antenna or other piece of equipment may indicate an equipment problem.

Exemplary Computer Operating Environment

The present invention can be implemented as a sequence of computer-executed steps. FIG. 1 illustrates various aspects of the preferred computing environment in which the present invention is designed to operate. FIG. 1 and the following discussion are intended to provide a brief, general description of a suitable computing environment in which the present invention may be implemented. While the present invention will be described in the general context of a distributed computing environment, those skilled in the art will recognize that the invention also may be implemented in other environments. In a distributed computing environment, tasks are performed by remote processing devices that are linked through a communications network. Program modules may be located in both local and remote memory storage devices. Generally, program modules include routines, programs, components, data structures, etc. that perform particular tasks or implement particular abstract data types. The invention may also be practiced in the context of an application program that runs on an operating system in conjunction with a personal computer or in combination with other program modules. Moreover, those skilled in the art will appreciate that the invention may be practiced with other computer system configurations, including hand-held devices, multiprocessor systems, microprocessor-based or programmable consumer electronics, minicomputers, mainframe computers, and the like.

With reference to FIG. 1, an exemplary system for implementing the invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 36, such as a customer billing application 36a, other program modules 37, and program data 38. A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

All the preferred methods of the present invention may be implemented with a computer system which utilizes a computer-readable medium. A computer readable medium may store a computer program which performs the steps of any of the preferred methods as a sequence of computer-executable steps.

Exemplary System Environment

The present invention provides a method for identifying geographic coordinates for a geographic point associated with a location and for using the geographic coordinates to identify the geographic region which contains the geographic point. The preferred methods for identifying the geographic coordinates and the geographic region may be implemented in a distributed computing environment. An exemplary distributed computing system for use in connection with the preferred methods is illustrated by FIG. 2.

Figure 2:
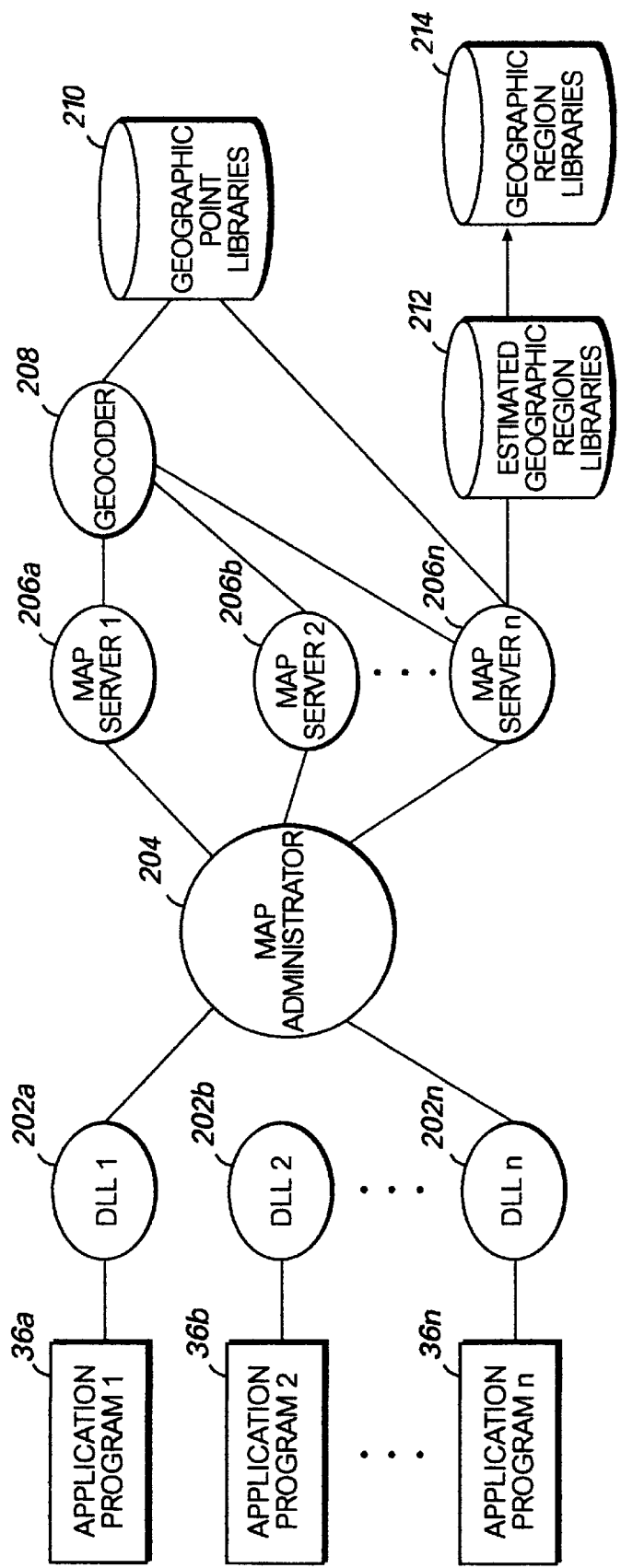
FIG. 2 is a block diagram of an exemplary distributed computing environment as may be used in connection with the preferred embodiments of the present invention.

A number of application programs 36a–36n are shown in FIG. 2. The application programs 36a–36n may be located in a single personal computer 20 or may be located in different computers. Representative applications include customer billing applications and customer service trouble tracking applications. Preferably, the distributed computing system includes a map administrator 204. A map administrator is a program module which provides a queuing mechanism to service simultaneous requests from the applications 36a–36n and a routing mechanism to route a request from an application 36a–36n to a map server 206a–206n. The map administrator may be located in a remote computer system 49 or in the same system as an application 36a–36n. In FIG. 2, the applications 36a–36n are shown connected to a map administrator 204 via dynamic link libraries 202a–202n. A dynamic link library is generally a program module which can be loaded prior to execution and then unloaded after execution. Other possible ways of connecting or interfacing an application 36a–36n to the map administrator 204 will be apparent to those skilled in the art.

FIG. 2 also shows a number of map servers 206a–206n. The map servers 206a–206n are also program modules. The map servers 206a–206n may be located in a remote computer system. The map servers 206a–206n may provide additional geocoding functions beyond those available in the geocoder 208. The map servers 206a–206n also provide a program module for determining the geographic region which contains a geographic point. The geocoder 208 is a program module which converts an address or an intersection into longitude and latitude. Although FIG. 2 only shows one geocoder, additional geocoders may be added to the system. In the preferred embodiment, the geocoder is a geocoder such as the P.A.C.E. geocoder marketed by Matchware Technologies. Alternatively, the geocoder could perform the functions supplied by the P.A.C.E. geocoder, as well as the additional functions supplied by the map servers.

The geocoder 208 and the map servers 206a–206n have access to geographic point libraries 210. The geographic point libraries contain longitude and latitude for a number of geographic points, including addresses, intersections, landmarks, and zip code centroids. Although FIG. 2 only shows one map server 206n connected to the geographic point libraries 210, each map server 206a–206n may be connected to the geographic point libraries 210. In addition to the geographic point libraries 210, the map servers also have access to geographic region libraries 214 and estimated geographic region libraries 212. The geographic region libraries 214 contain longitude and latitude for the boundary points for a number of geographic regions such as BTA's. The estimated geographic region libraries 212 contain longitude and latitude for the boundary points for a number of estimated geographic regions. In the preferred embodiment, an estimated geographic region library contains an entry for each estimated geographic region. Each entry includes two longitudinal coordinates and two latitudinal coordinates for the estimated geographic regions, a region identifier, a region name and a pointer to a file in the geographic region data library corresponding to a geographic region. The geographic libraries 210, 212, and 214 may be stored on a hard disk drive 27, an optical disk drive 31, or on another type of storage media.

The Geographic Environment

Longitude and latitude preferably provide a geographic coordinate system for use in connection with the present invention. Other coordinate systems such as an x-y coordinate system may be used with the present invention with appropriate adjustments. A geographic point is a point within the geographic coordinate system and is preferably described by geographic coordinates such as longitude and latitude. A geographic point may be associated with a location. A geographic point is associated with a location if the longitude and latitude for the location are the same as the longitude and latitude for the geographic point. Even if the longitude and latitude for the geographic point are not the same as the longitude and latitude for the location, the geographic point may still be associated with the location. If the longitude and latitude for the geographic point approximate the longitude and latitude for the location, then the geographic point is associated with the location.

For example, a location may be described by an address. The address may be geocoded to identify the longitude and latitude for the address. The longitude and latitude for the address define a geographic point. In this case, the longitude and latitude for the location are the same as the longitude and latitude for the geographic point, so the geographic point is associated with the location. In another example, a location may be described by a nearby intersection. The intersection may be geocoded to obtain longitude and latitude for the intersection. The longitude and latitude for the intersection define a geographic point. In this case, the longitude and latitude for the location are not the same as the longitude and latitude for the geographic point. However, the longitude and latitude for the geographic point approximate the longitude and latitude for the location, so the geographic point is associated with the location.

In addition to defining a geographic point, longitude and latitude may be used to define a geographic region. A geographic region is defined by a boundary including a plurality of boundary points. Each boundary point is a geographic point and may be described by longitude and latitude. Once a geographic point associated with the location is described by longitude and latitude and the boundary points of the geographic regions in a geographic area are described by longitude and latitude, the geographic region which contains the geographic point may be identified.

Figure 4:
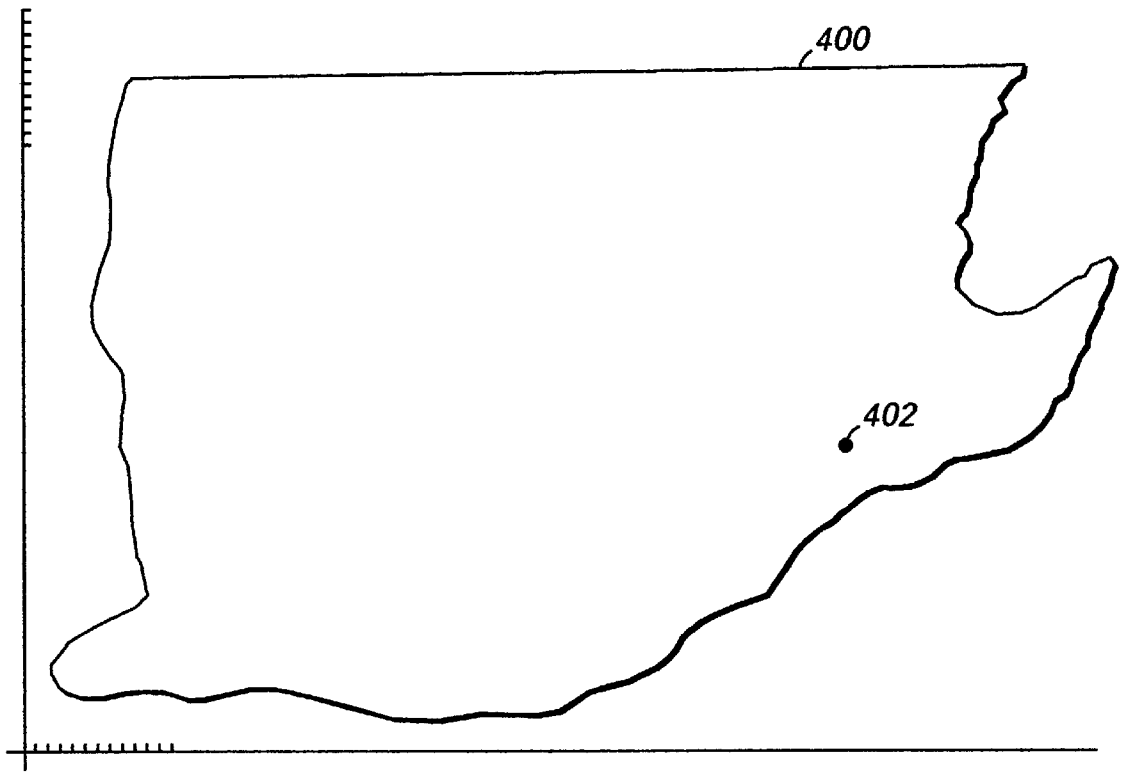
FIG. 4 illustrates an exemplary geographic area and a geographic point as may be used in connection with the preferred embodiments.
Figure 5:
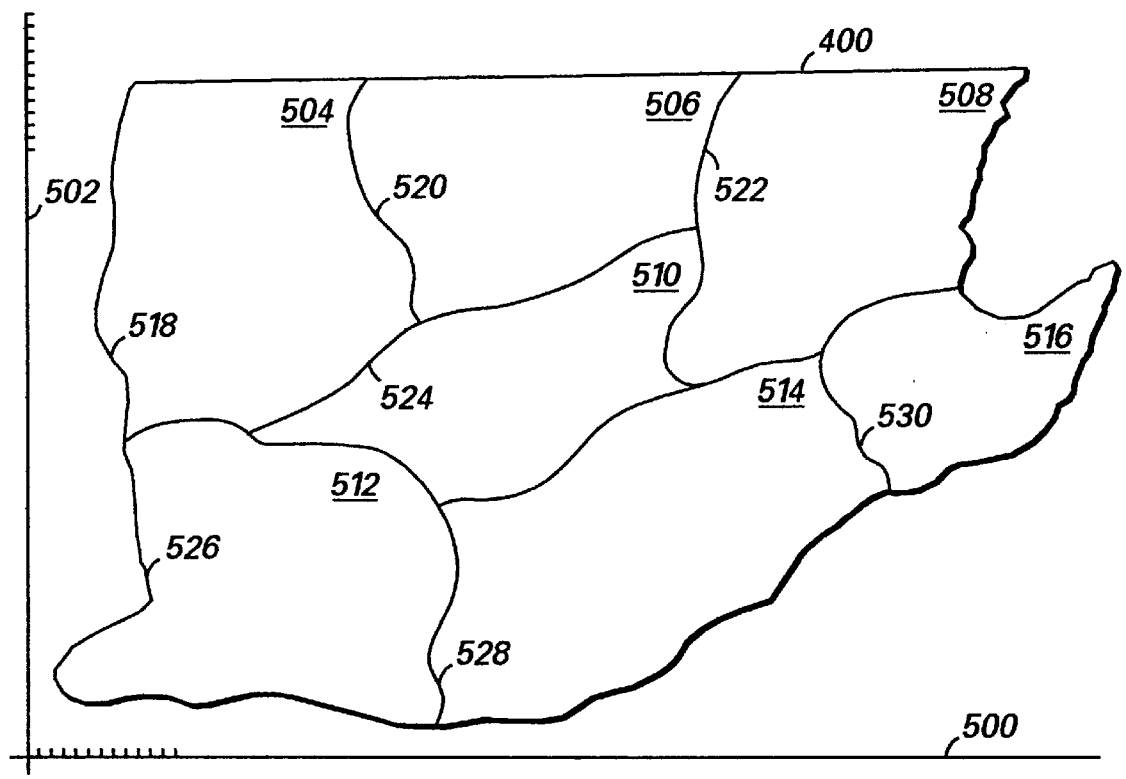
FIG. 5 illustrates the geographic area of FIG. 4 divided into geographic regions.

An exemplary geographic area 400 and a geographic point 402 located within the geographic area are shown in FIG. 4. FIG. 5 illustrates the geographic area 400 divided into a plurality of non-overlapping geographic regions 504, 506, 508, 510, 512, 514, and 516. A geographic region may be of any size or shape and may be irregularly shaped. There may be any number of geographic regions in a geographic area. Each geographic region is defined by a boundary 518, 520, 522, 524, 526, 528, and 530, including a plurality of boundary points. Each boundary point is a geographic point and is preferably described by longitude and latitude. As an example, a geographic area could be divided into geographic regions representing BTA's whose size and shape are defined by the FCC.

Preferred Method for Identifying Geographic Coordinates for a Geographic Point Associated with a Location To identify geographic coordinates for a geographic point associated with a location, a description of the location is needed. The location may be described by an address or by a nearby intersection or landmark. The description of the location is geocoded to convert the description into longitude and latitude. The system shown in FIG. 2 may be used to geocode a description of a location. An application program 36a–36n, for example customer billing application program 36a, requests longitude and latitude for a location described by an address. Preferably, the address is a street address including a street number, a street name, a city, a state and a zip code. The map administrator 204 determines which map server 206a–206n is available and routes the request, including the address, to the available map server 206a–206n, for example, map server 206a. The map server 206a receives the address and sends the address to the geocoder 208. The geocoder 208 receives the address and preferably determines whether there is an address match candidate for the address. An address match candidate is an address which the geocoder 208 determines is a likely match for the address received from the application. The address match candidate may be described by an address, but may also be described by longitude and latitude because the address match candidate is also a geographic point. If there is an address match candidate for the address, then the address match candidate is returned to the application 36a via the map server 206a.

The application 36a makes an address determination as to whether the address match candidate is associated with the location. The address determination may be made by comparing the components of the address describing the location with the components of the address match candidate. For example, comparing the street number, the street name, the city and the state. The comparison may be made by the application program or may be made by a customer service representative comparing the address and the address match candidate. Preferably, if all of the components of the address of the address match candidate match all the components of the address describing the location, then the address determination is that the address match candidate is associated with the location. The results of the address determination are communicated to the map server 206a. If the address determination is that the address match candidate is associated with the address, then the map server 206a requests that the geocoder 208 provide longitude and latitude for the address match candidate. Once the geocoder 208 provides the longitude and latitude for the address match candidate to the map server, the map server 206a sends the longitude and latitude to the application 36a. In this manner, the geographic coordinates for a geographic point associated with the location are identified.

The preferred method may be illustrated by an example in which an application requests geographic coordinates for a location described by an address of 1125 North Main Street, Atlanta, Ga. 30303. The map administrator receives the address from the application and determines which map server is available to handle the request. Once an available map server is identified, the map administrator sends the address to the map server. The map server receives the address and forwards the address to the geocoder. The geocoder receives the address and determines an address match candidate for the address. In this example, the address match candidate is 1125 North Main Street, Atlanta, Ga. The map server receives the address match candidate from the geocoder and sends the address match candidate, 1125 North Main Street, Atlanta, Ga., to the application.

The application compares the address match candidate to the location. In this example, the location was described by an address so the address for the location is compared to the address for the address match candidate. Since the address and the address match candidate are identical, the address determination is that the address match candidate is associated with the address. The result of the address determination is communicated to the map server. In response to the address determination, the map server obtains the geographic coordinates for the address match candidate from the geocoder and returns the geographic coordinates to the application.

The address for the address match candidate and the address describing the location may not always be identical. For example, an address of 1125 North Main Street, Atlanta, Ga. is provided by the application, but the geocoder may identify address match candidates of (1) 125 North Main Street, Atlanta, Ga. and (2) 1125 South Main Street, Atlanta, Ga. The geocoder sends the address match candidates to the map server and the map server returns the address match candidates to the application. The application makes an address determination by comparing the addresses for the address match candidates with the address for the location. Since the addresses are not identical, the application may need to do more than just compare the elements of the addresses. The application may attempt to verify that the address, 1125 N. Main Street, Atlanta, Ga., sent to the map server is correct. If the application determines that the address sent to the map server is incorrect, and that the correct address is actually 125 N. Main Street, Atlanta, Ga., then the address determination is that address match candidate number one is associated with the location. In a customer billing application, the street number may have been incorrectly entered by a customer service representative or the customer may have supplied an incorrect street number.

As the example in the immediately preceding paragraph illustrates, the geocoder may return more than one address match candidate. If the geocoder returns more than one address match candidate, then preferably the application repeats the step of making an address determination as to whether the address match candidate is associated with the location. The step of making an address determination is repeated until the address determination is that the address match candidate is associated with the location or until all the address match candidates received from the map server are reviewed.

There may be times when the geocoder does not return any address match candidates. If the geocoder does not return any address match candidates, then the map server makes an address match candidate determination that there is no address match candidate associated with the address. If the geocoder returns an address match candidate, then the map server makes an address match candidate determination that there is an address match candidate associated with the address.

Preferably, if the address match candidate determination is that there is no address match candidate associated with the address, then the map server deletes the street number from the address to create a modified address and sends the modified address to the geocoder. The geocoder determines a modified address match candidate based upon the modified address. The map server receives the modified address match candidate and sends the modified address match candidate to the application. The application then makes a modified address determination as to whether the modified address match candidate is associated with the location. In this case, the modified address is described by an address and the location is also described by an address. The application may compare the components of the address for the modified address match candidate with the components of the address for the location to determine whether the modified address match candidate is associated with the location. If the modified address match candidate is associated with the location, then the longitude and latitude for the address match candidate are identified.

If neither an address match candidate nor a modified address match candidate are associated with the location, then the map server queries the application for information describing a nearby intersection. Alternatively, if an address is not available, the method may begin with the application providing an intersection. An intersection is the point where two streets cross. An intersection may be described by providing two intersecting streets, the city and the state.

After receiving the intersection, the map server sends the intersection to the geocoder. The geocoder identifies an intersection match candidate for the intersection and returns the intersection match candidate to the map server. The map server then sends the intersection match candidate to the application.

After receiving the intersection match candidate, the application makes an intersection determination as to whether the intersection match candidate is associated with the location. In the case of an intersection, the application compares the intersecting streets, the city and the state for the intersection match candidate with the intersecting streets, the city and the state for the intersection to make the intersection determination. If the intersection determination is that the intersection match candidate is associated with the location, then the geographic coordinates for the intersection match candidate are identified.

The preferred method using an intersection may be illustrated by an example. In this example, a customer is traveling on North Main Street when the customer's call is dropped. The customer does not know the address where the problem occurred but recalls crossing 11th Street just before the call was dropped. The customer provides the following description of the problem location to a customer service representative: North Main Street and 11th Street, Atlanta, Ga. The intersection, North Main Street, 11th Street, Atlanta, Ga., is sent to the map server and, in turn, to the geocoder. The geocoder identifies an intersection match candidate based upon the intersection. An example of an intersection match candidate for the intersection is North Main Street & NW 11th Street, Atlanta, Ga.

The intersection match candidate is sent to the map server and the map server returns the intersection match candidate to the application. The application makes an intersection determination by comparing the components of the intersection match candidate with the components of the intersection describing the location. The components of the intersection match candidate and the intersection include intersecting streets, city and state. If the components of the intersection match candidate and the components of the intersection are the same, then the intersection determination is that the intersection match candidate is associated with the location.

If the intersection determination is that the intersection match candidate is not associated with the location, then preferably the map server queries the application for a landmark. Alternatively, if only landmark information is available, the method may begin by receiving a landmark. A landmark is a well-known structure or other permanent object. A landmark may be described by providing a short description of the landmark, the city and state. An example of a landmark is: State Capital, Atlanta, Ga. The landmark, State Capital, Atlanta, Ga., is sent to the map server and, in turn, to the geocoder. The geocoder identifies a landmark match candidate based upon the landmark.

The landmark match candidate is sent to the map server and the map server returns the landmark match candidate to the application. The application makes a landmark determination by comparing the components of the landmark match candidate with the components of the landmark describing the location. The components of the landmark match candidate and the landmark include a short description of the landmark, the city and the state. If the components of the landmark match candidate and the components of the landmark are the same, then the landmark determination is that the landmark match candidate is associated with the location.

If none of the match candidates (address, modified address, intersection or landmark) are associated with the location, then geographic coordinates for a geographic point associated with the zip code of the location are identified. Preferably, the zip code defines a geographic zone and the geographic point associated with the zip code is the centroid of the zip code zone.

The foregoing method for identifying geographic coordinates for a geographic point associated with a location has been described using several different types of determinations, namely, an address match candidate determination, an address determination, a modified address determination, an intersection determination, and a landmark determination. Different embodiments of the present invention may correspond to different combinations of the determinations. For example, an address match candidate determination, an address determination and a modified address determination may be used in one embodiment. A second embodiment may comprise an address match determination, an intersection determination, and a landmark determination. A third embodiment may comprise an address match candidate determination, an address determination, a modified address determination, an intersection determination, and a landmark determination.

The different types of determinations operate upon different types of location information. An address match candidate determination, an address determination and a modified address determination operate upon an address. An intersection determination operates upon an intersection description and a landmark determination operates upon a landmark description. By including different types of determinations, geographic coordinates for a geographic point may be identified using the available location information (address, intersection description, landmark description or zip code). The steps for identifying geographic coordinates for a geographic point associated with a location may include steps corresponding to the different types of determinations.

Flow Diagrams for the Preferred Method of Identifying Geographic Coordinates

Figure 3A:
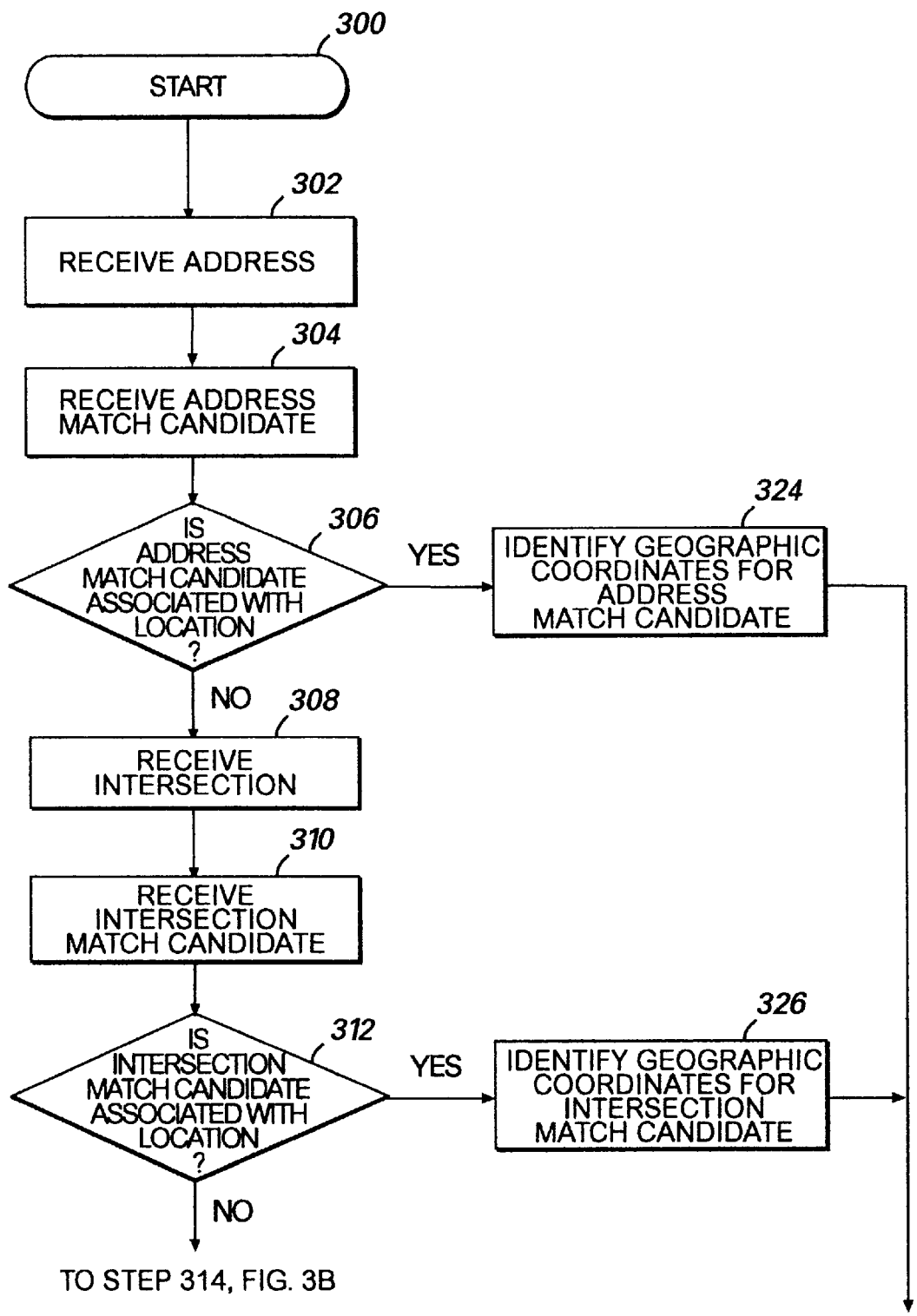
FIGS. 3A, 3B and 3C are flow diagrams of the preferred methods for identifying geographic coordinates for a geographic point associated with a location.
Figure 3B:
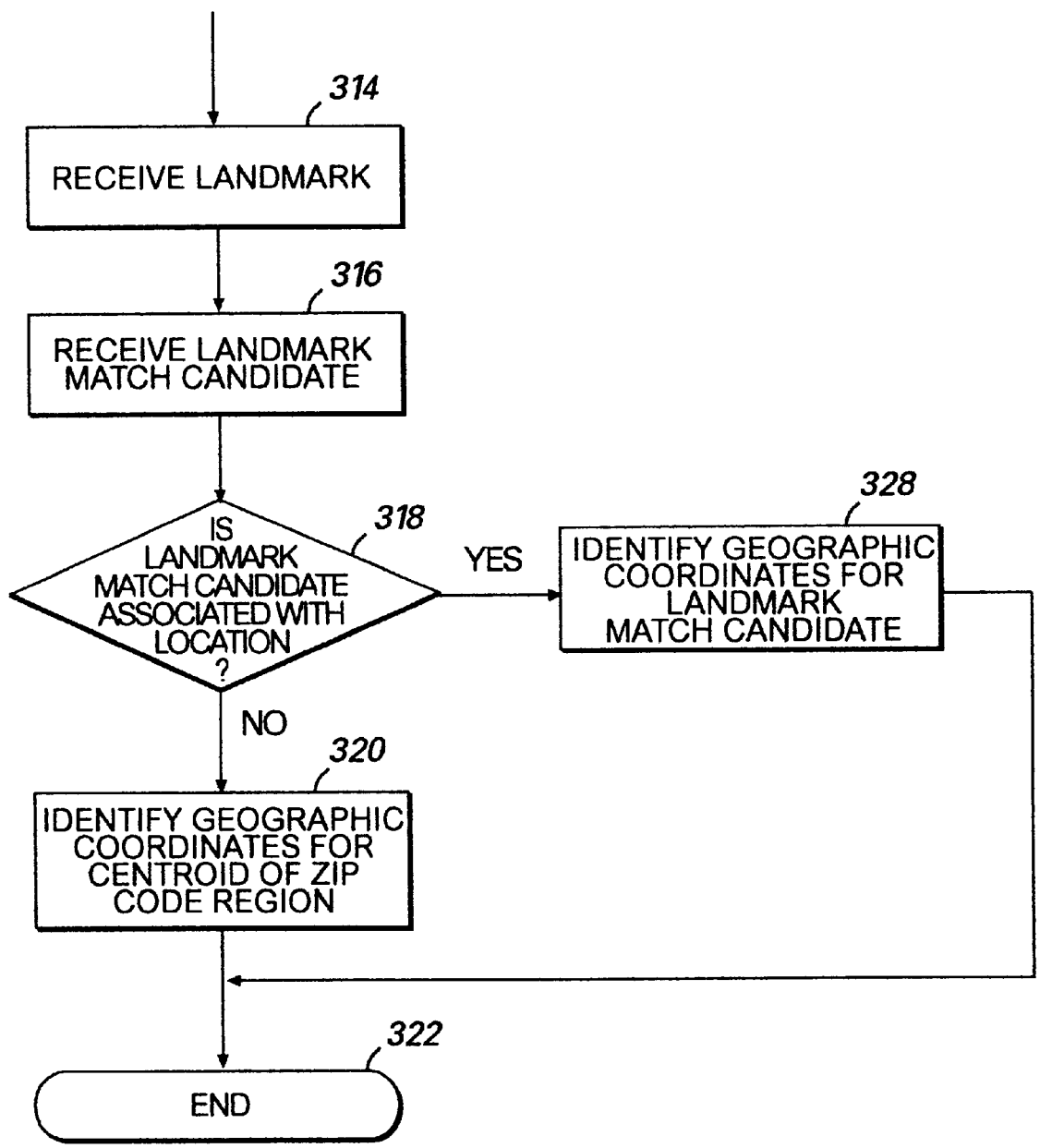
Figure 3C:
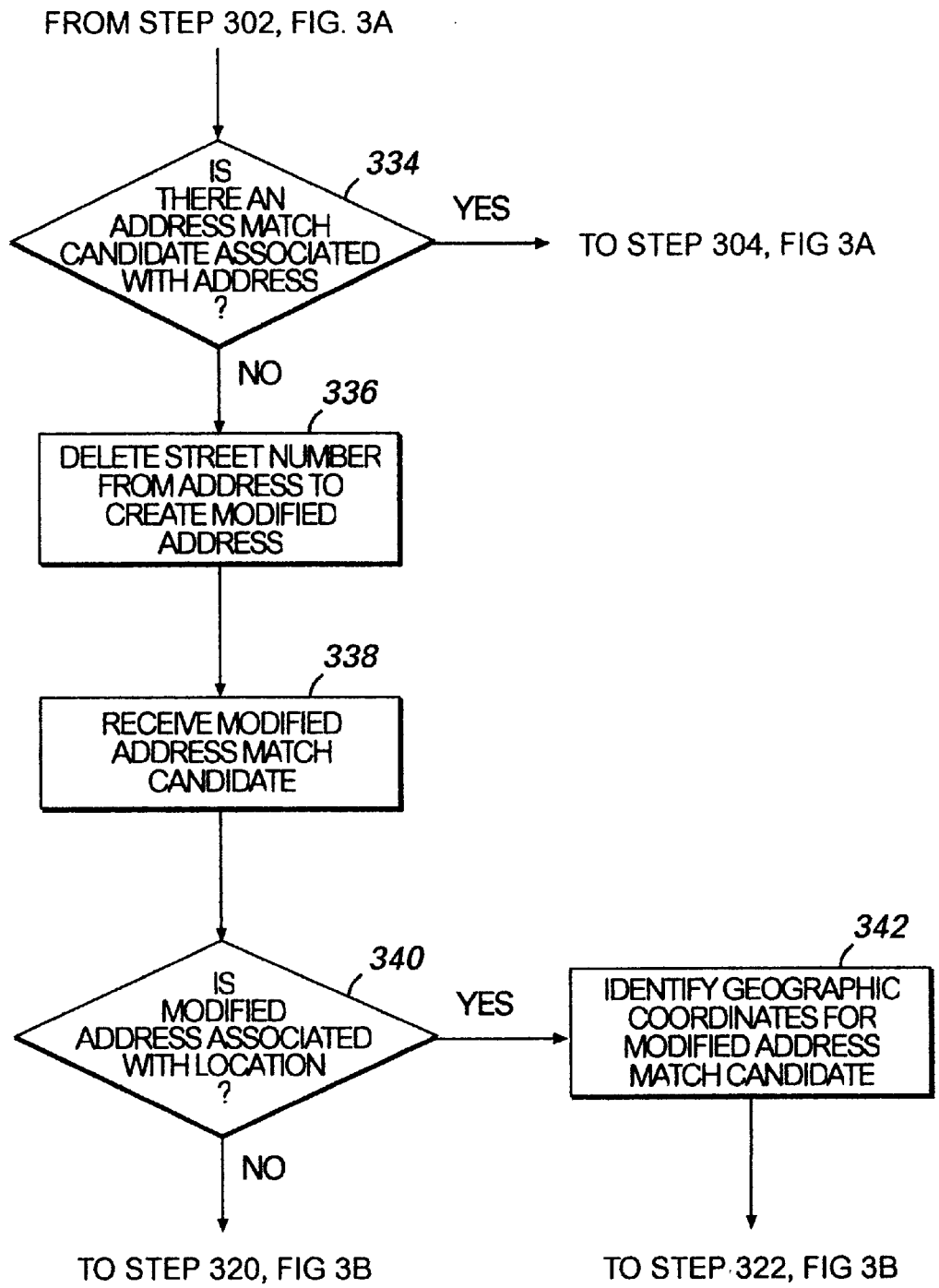

Flow diagrams for the preferred method of identifying geographic coordinates for a geographic point associated with a location are shown in FIGS. 3A–3C. The flow diagrams of FIGS. 3A–3C illustrate the steps of the preferred method for identifying geographic coordinates for a geographic point associated with a location. Once the geographic coordinates are identified, then the geographic coordinates may be used in one of the preferred methods for identifying the geographic region which contains the geographic point. Referring to FIG. 3A, the preferred method begins at step 300. In step 302, an address, including a zip code is received. After the address is received, an address match candidate is identified. The address match candidate is identified, in part, based upon the address. The address match candidate is received in step 304. In step 306, an address determination is made as to whether the address match candidate is associated with the location. The address determination may include comparing the components of the address match candidate with the components of the address.

If the address determination is that the address match candidate is not associated with the location, then the method proceeds to step 308 of FIG. 3A. In step 308, an intersection is received and in step 310, an intersection match candidate is received. In step 312, an intersection determination is made by making a determination as to whether the intersection match candidate is associated with the location. The intersection determination may include comparing the components of the intersection match candidate to the components of the intersection. If the intersection determination is that the intersection match candidate is associated with the location, then the method proceeds to step 326 and the geographic coordinates for the intersection match candidate are identified. The method then ends at step 322 in FIG. 3B.

However, if the intersection determination is that the intersection match candidate is not associated with the location, then the method proceeds to receive a landmark in step 314. After the landmark is received, a landmark match candidate is received in step 316. In step 318, a landmark determination is made as to whether the landmark match candidate is associated with the location. The landmark determination may include comparing the landmark match candidate and the landmark. If the landmark determination is that the landmark match candidate is associated with the location, then the geographic coordinates for the landmark match candidate are identified in step 328. If the landmark determination is that the landmark match candidate is not associated with the location, then preferably, the geographic coordinates for the centroid of the geographic region defined by the zip code are identified. After the geographic coordinates based on the zip code are identified, the method ends at step 322.

There may be times when there is no address match candidate. This situation is illustrated by the flow diagram of FIG. 3C. After an address is received in step 302, an address match candidate determination is made in step 334 of FIG. 3C. If there is no address match candidate associated with the address, then the method proceeds to step 336. The street number is deleted from the address to create a modified address in step 336. The method then proceeds to receive a modified address match candidate in step 338. After the modified address match candidate is received, a modified address determination is made in step 340. The modified address determination determines whether the modified address match candidate is associated with the location. If the modified address determination is that the modified address match candidate is associated with the location, then the geographic coordinates for the modified address match candidate are identified in step 342. However, if the modified address determination is that the modified address match candidate is not associated with the location, then the method continues with step 320 of FIG. 3B. In step 320, geographic coordinates for a geographic point associated with the zip code zone are identified. Although the flow diagram of FIG. 3D illustrates that the method proceeds from the NO branch of step 340 to step 320, alternatively, the method may proceed to step 308, to receive an intersection, or to step 314 to receive a landmark.

Geographic coordinates for a geographic point associated with a location may be identified by following the steps illustrated by the flow diagrams of FIGS. 3A–3C and discussed in the foregoing paragraphs. Preferably, the geographic coordinates for the geographic point are longitude and latitude. Once the geographic coordinates for a geographic point associated with a location are identified, the geographic coordinates may be used in one of the preferred methods for identifying the geographic region which contains a geographic point. The preferred methods for identifying the geographic region which contains a geographic point are described below.

Preferred Methods for Identifying the Geographic Region Which Contains a Geographic Point The present invention also provides several preferred methods for identifying the geographic region which contains a geographic point. Preferably, the geographic point is described by longitude and latitude. The preferred methods may be divided into two groups. One group of preferred methods uses estimated geographic regions. The other group of preferred methods does not use estimated geographic regions. A description of the group of preferred methods which does not use estimated geographic regions is presented first.

Basic Method

All the preferred methods for identifying the geographic region which contains a geographic point share a common basic method. The basic method described herein is referred to as the Basic Method for ease of reference. The first step of the Basic Method is to select one of the plurality of non-overlapping geographic regions as a selected region. The selection of the selected region may be arbitrary or may be based on some type of hierarchy. For example, the geographic region last identified as containing a geographic point or most often identified as containing a geographic point could be selected. Once a geographic region is selected as the selected region, a determination is made as to whether the geographic point is located within the selected region. The preferred methods within a group correspond to different methods for making a determination as to whether the geographic point is located within the selected region. If the determination is that the geographic point is located within the selected region, then the selected region is identified.

The steps of the preferred methods for identifying the geographic region which contains a geographic point may be performed by a map server, for example, map server 206a of FIG. 2. Once longitude and latitude for a geographic point associated with a location are provided by the geocoder 208, an application 202a–202n may request that the BTA which contains the geographic point be identified. To request the identification of the BTA which contains the geographic point, the application, for example 36a, sends the longitude and latitude for the geographic point via the DLL 202a and the map administrator 204 to one of the map servers, for example 206a. The map server 206a preferably uses the estimated geographic region libraries 212 and the geographic region libraries 214 to identify the BTA which contains the geographic point. In the preferred embodiment, the geographic region libraries include data for the boundaries for the BTA's within a geographic area and the estimated geographic region libraries include data for the boundaries of corresponding estimated BTA's.

Boundary Point Pair Method

The first preferred method for identifying the geographic region which contains a geographic point described herein is referred to as the Boundary Point Pair Method for ease of reference. The Boundary Point Pair Method follows the overall method of the Basic Method. In the Boundary Point Pair Method, the determination as to whether the geographic point is located within the selected region is made by drawing a line of predetermined slope through the geographic point and through the selected region so that the line intersects the boundary of the selected region at a first boundary point and at a second boundary point. A first boundary point and a second boundary point comprise a boundary point pair. If the geographic point lies on the line between the first boundary point and the second boundary point, then the determination is that the geographic point is located within the selected region.

The Boundary Point Pair Method is illustrated by reference to the figures. FIG. 4 shows the geographic area 400 and a geographic point 402 located in the geographic area. In FIG. 5, this geographic area 400 is divided into a plurality of non-overlapping geographic regions 504, 506, 508, 510, 512, 514, and 516. Each of these geographic regions is defined by a boundary 518, 520, 522, 524, 526, 528, and 530, respectively. Each boundary is made up of a plurality of boundary points (not individually illustrated). In an application of the present invention by a wireless service provider, the geographic area 400 may be a multi-state area and the geographic regions 504, 506, 508, 510, 512, 514, and 516 may be BTA'S. Information for the division of the multi-state area into a plurality of BTA's and for the boundary points of the BTA's may be obtained from a BTA library. Preferably, a BTA library contains an ordered set of boundary points with each boundary point described by longitude and latitude. The boundary points may be arranged in a clockwise or a counter-clockwise order. If the boundary points are arranged in a clockwise order, then the beginning boundary point is followed by the boundary point next encountered as the boundary of the geographic region is traversed in a clockwise direction. For ease of explanation, a pair of axes 500 and 502 disposed at right angles to each other are shown in FIGS. 5–11. The horizontal axis 500 represents latitude and the vertical axis 502 represents longitude.

Figure 6:
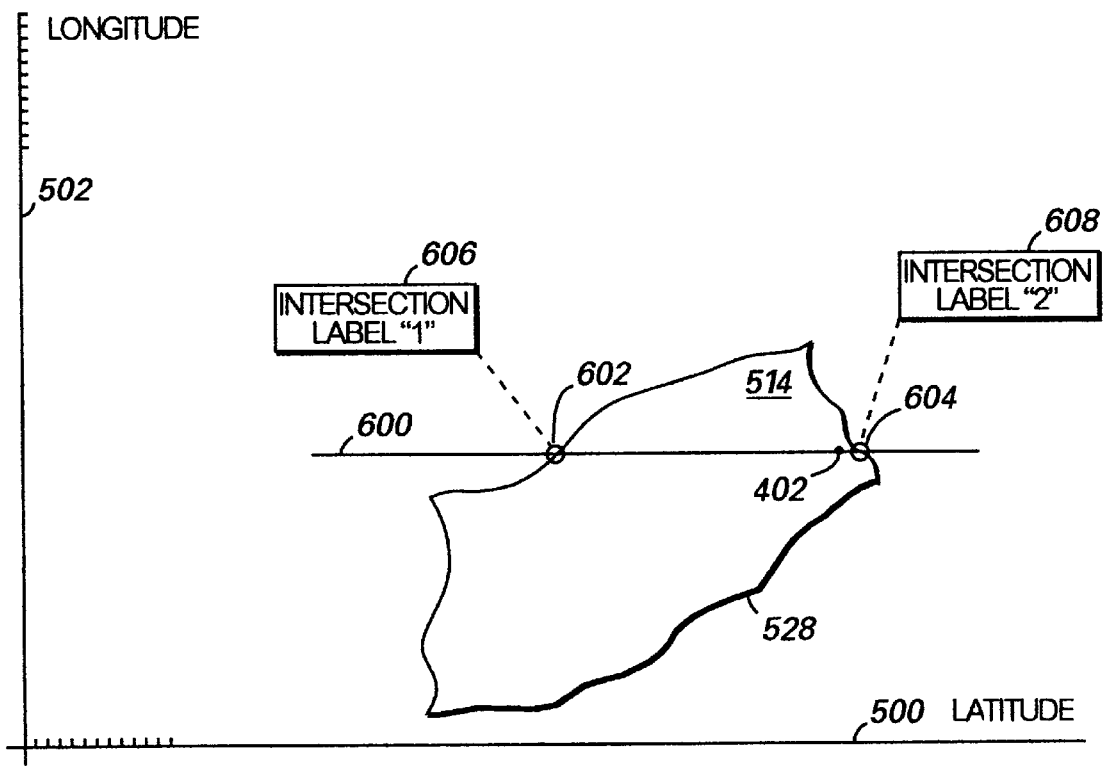
FIG. 6 illustrates a geographic region of the geographic area of FIG. 4 and intersection points between a line with predetermined slope and the boundary of the geographic region.

In FIG. 6, geographic region 514 is shown as the selected region. After geographic region 514 is selected as the selected region, a straight line 600 of predetermined slope is drawn through the geographic. point 402. The line 600 is also drawn through the selected region 514 so that the line intersects the boundary 528 of the selected region 514 at a first boundary point 602 and at a second boundary point 604. As shown in FIG. 6, the line is horizontal and has a slope of zero as defined by the geographic coordinate system of longitude and latitude. A straight line with zero slope is preferably used because all points on the line have a common latitude. This common latitude simplifies the determination as to whether the geographic point 402 lies on the line 600 between the first boundary point 602 and the second boundary point 604. In addition, a straight line with zero slope is easy to construct. Although other slopes and types of lines may be used, the adjustments required to account for a non-zero slope or a curved line may require additional computational time.

The first step in identifying the first boundary point and the second boundary point is to create a table of boundary sides. A boundary side is defined by two consecutive boundary points on the region boundary. For example, if point 1, point 2 and point 3 are consecutive boundary points, then point 1 and point 2 define a boundary side and point 2 and point 3 define a boundary side. A boundary side is a straight line beginning at a boundary point and ending at the next consecutive boundary point. The table of boundary sides includes an entry for each boundary side. The first entry in the table of boundary sides contains the boundary side defined by a beginning boundary point. Each entry in the table of boundary sides contains the longitude and latitude for the boundary points which form the endpoints of the boundary side. After the table of boundary sides is created, the latitude for the line of predetermined slope is compared with the latitude of the boundary points of each entry. If the latitude for one of boundary points is greater than or equal to the latitude for the line and the latitude for the other boundary point is less than or equal to the latitude for the line, then the boundary side is identified as an intersecting side. In the Boundary Point Pair Method, at least two boundary sides are identified as intersecting sides.

The intersecting sides are used to determine the longitude for the first boundary point and the second boundary point. In the preferred embodiment, the latitude for the first boundary point and the second boundary point is known since the first boundary point and the second boundary point both lie along the line with zero slope drawn through the geographic point. The longitude for the first boundary point and the longitude for the second boundary point are calculated using the endpoints of the two intersecting sides. The following formula is used to calculate the longitude for an intersection point such as the first boundary point:

$$X_i = X_1 + ((Y_i - Y_1)/m)$$

where $X_i$ is the longitude for the intersection point,
$X_1$ is the longitude for an endpoint of the intersecting side,
$Y_i$ is the latitude for the line,
$Y_1$ is the latitude for an endpoint of the intersecting side, and
m is the slope of the intersecting side.

Once the longitude and latitude for the first boundary point and the second boundary point are identified, the longitude and latitude for the intersection points are placed in an intersection point table. The order of the entries in the intersection point table follow the order of the entries in the table of boundary sides. An intersection point table is used as an aid in determining whether a geographic point lies within the selected region. Other aids to the determination of whether a geographic point lies within the selected geographic region will occur to those skilled in the art.

Preferably, the intersection point table includes two columns, an intersection label column and an intersection point coordinates column. The intersection label column contains an intersection label for each intersection point. Intersection labels alternate between two types of intersection labels. In the preferred embodiment, the intersection labels alternate between odd numbers and even numbers. Sequential numbers are used for intersection labels so that the intersection labels reflect the relative positions of the intersection points along the line. For example, the first intersection point is labeled with intersection label "1" and the second intersection point is labeled with intersection label "2." If there are additional intersection points, then the next intersection point is labeled with intersection label "3" and the intersection point after that is labeled with intersection label "4". Intersection labeling continues until all intersection points are labeled. As will be apparent to those skilled in the art, any alternating labels may be used so long as the relative positions of the intersection points are maintained.

The intersection point coordinates column contains longitude and latitude for the intersection point. The number of rows in the intersection point table is determined by the number of intersection points. Generally, one row is included for each intersection point.

Once the intersection point table is completed, the longitude for the geographic point is compared to the longitude for the intersection points. If the longitude for the geographic point is equal to or between the longitude for a first boundary point and a second boundary point and the first boundary point has an odd intersection label and the second boundary point has an even intersection label, then the geographic point is located within the geographic region. If the longitude for the geographic point is between the longitude for a second boundary point and a third boundary point and the second boundary point has an even intersection label and the third boundary point has an odd intersection label, then the geographic point is not located within the geographic region.

The preferred methods use intersection tables to make a determination as to whether the geographic point is located within the selected region without graphing or mapping the geographic point and the selected region. The intersection table may not be visually apparent to the user.

Returning to the example illustrated by FIG. 6, the first boundary point 602 is labeled with intersection label "1" 606 and the second boundary point 604 is labeled with intersection label "2" 608. An intersection table for the example illustrated by FIG. 6 is shown by Table 1 below. Table 1 contains two rows, one for each intersection point. The first row contains intersection label "1" in the first column and the geographic coordinates for the first boundary point in the second column. The longitude for the first boundary point is $X_{602}$ and the latitude for the first boundary point is $Y_{602}$. The second row contains intersection label "2" in the first column and the geographic coordinates for the second boundary point in the second column. The longitude for the second boundary point is $X_{604}$ and the latitude for the second boundary point is $Y_{604}$.

TABLE 1

| Intersection Label | Intersection Point Coordinates |
|---|---|
| 1 | $(X_{602}, Y_{602})$ |
| 2 | $(X_{604}, Y_{604})$ |

Figure 7:
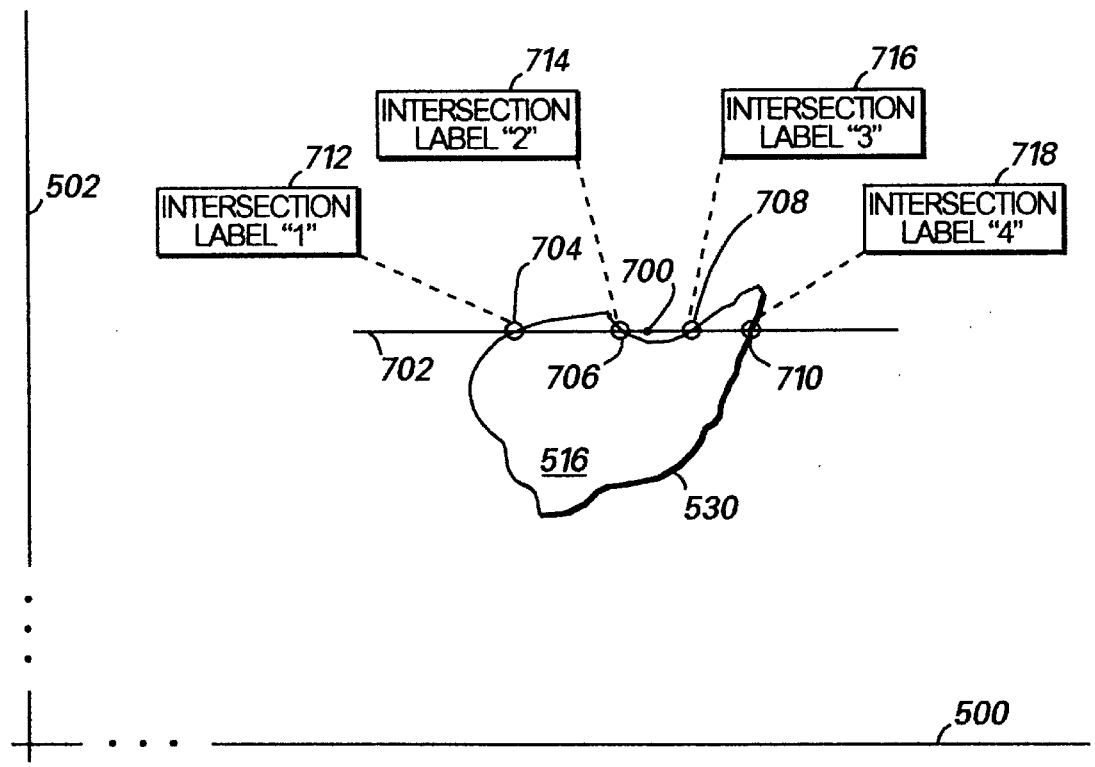
FIG. 7 illustrates a geographic region of the geographic area of FIG. 4 and intersection points between a line with predetermined slope and the boundary of the geographic region.

As mentioned above, there may be times when the line with predetermined slope intersects the boundary of the selected region so that there are multiple boundary point pairs. FIG. 7 shows an example with two boundary point pairs. In FIG. 7, geographic region 516 is selected as the selected region. A straight line 702 of predetermined slope is drawn through the geographic point 700 so that the line intersects the boundary 530 of the selected region 516 at a first boundary point 704 and at a second boundary point 706. The line 702 also intersects the boundary 530 of the selected region 516 at another first boundary point 708 and at another second boundary point 710.

The intersection points are determined by creating a table of boundary sides to identify intersecting sides and by creating a table of intersection points as described above. The table of intersection points includes entries for the first boundary point 704 of the first boundary point pair, the second boundary point 706 of the first boundary point pair, the first boundary point 708 of the second boundary point pair, and the second boundary point 710 of the second boundary point pair. Preferably, the first boundary point 704 of the first boundary point pair is labeled with intersection label "1" 712, the second boundary point 706 of the first boundary point pair is labeled with intersection label "2" 714, the first boundary point 708 of the second boundary point pair is labeled with intersection label "3" 716, and the second boundary point 710 of the second boundary point pair is labeled with intersection label "4" 718. In this example, the table of intersection points has four rows because there are four intersection points. The first row contains intersection label "1" and the geographic coordinates $(X_{704}, Y_{704})$ for the first boundary point 704 of the first boundary point pair. The second row contains intersection label "2" and the geographic coordinates $(X_{706}, Y_{706})$ for the second boundary point 706 of the first boundary point pair. The third row contains intersection label "3" and the geographic coordinates $(X_{708}, Y_{708})$ for the first boundary point 708 of the second boundary point pair. The fourth row contains intersection label "4" and the geographic coordinates $(X_{710}, Y_{710})$ for the second boundary point 710 of the second boundary point pair. The intersection point table for this example is shown in Table 2.

TABLE 2

| Intersection Label | Intersection Point Coordinates |
|---|---|
| 1 | $(X_{704}, Y_{704})$ |
| 2 | $(X_{706}, Y_{706})$ |
| 3 | $(X_{708}, Y_{708})$ |
| 4 | $(X_{710}, Y_{710})$ |

After Table 2 is built, the longitude for the geographic point 700 is compared to the longitude for the intersection points. In this example, the longitude for the geographic point 700 is between the second boundary point 706 of the first boundary point pair and the first boundary point 708 of the second boundary point pair. The second boundary point 706 of the first boundary point pair has an even intersection label and the first boundary point 708 of the second boundary point pair has an odd intersection label so the determination is that the geographic point is not located within the geographic region.

Continuing with the Boundary Point Pair Method, the geographic point may not lie on the line between a first boundary point and a second boundary point. Then, preferably the determination is that the geographic point is not located within the selected region. In that case, another one of the geographic regions is selected as the selected region and a determination is made as to whether the geographic point is located within that selected region. Further details are provided by reference to FIG. 8.

Figure 8:
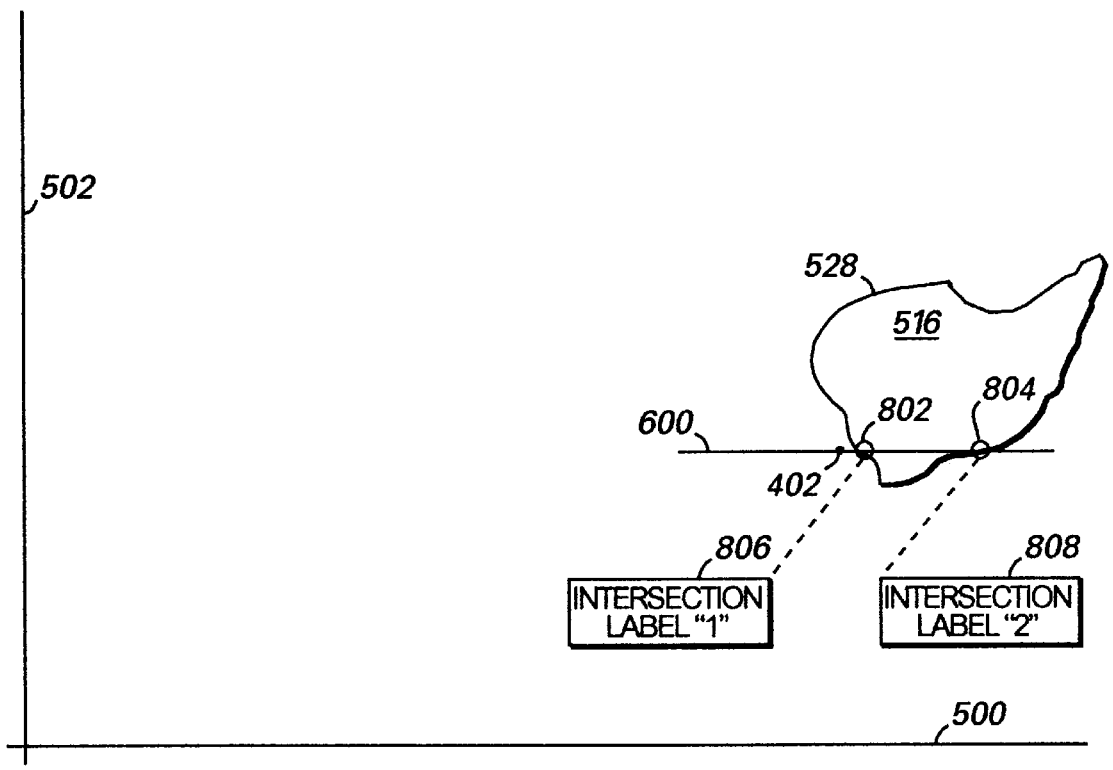
FIG. 8 illustrates the geographic region of FIG. 7 and intersection points between a line with predetermined slope and the boundary of the geographic region.

In FIG. 8, an example is provided of a geographic point that is not located within a selected region. In this example, the geographic point 402 is the same as the geographic point used in connection with the example illustrated in FIG. 6. Instead of geographic region 514 being selected as the selected region, in FIG. 8, geographic region 516 is selected as the selected region. As in the previous example, a straight line 600 of predetermined slope is drawn through the geographic point 402 and through the selected region 516 so that the line intersects the boundary 528 of the selected region 516 at a first boundary point 802 of the selected region and at a second boundary point 804 of the selected region.

As described above, a table of boundary sides is created and a table of intersecting points is created. In this example, the first boundary point 802 is labeled with intersection label "1" 806 and the second boundary point 804 is labeled with intersection label "2" 808. The table of intersecting points contains two rows. The first row contains intersection label "1" in the first column and the geographic coordinates ($X_{802}$, $Y_{802}$) for the first boundary point 802 in the second column. The second row contains intersection label "2" in the first column and the geographic coordinates ($X_{804}$, $Y_{804}$) for the second boundary point 804 in the second column. The intersection point table for this example is shown in Table 3.

TABLE 3

| Intersection Label | Intersection Point Coordinates |
|---|---|
| 1 | ($X_{802}$, $Y_{802}$) |
| 2 | ($X_{804}$, $Y_{804}$) |

After the table is built, the longitude for the geographic point 402 is compared to the longitude for the first boundary point 802 and the second boundary point 804. In this example, the longitude for the geographic point is not between the longitude for first boundary point and the second boundary point so the determination is that the geographic point does not lie on a line between the first boundary point and the second boundary point.

Single Boundary Point Method

There may be times when a geographic point is located such that a straight line drawn through the geographic point will not intersect the selected region at a first boundary point and at a second boundary point. This situation is handled by another one of the preferred methods, the Single Boundary Point Method. The Single Boundary Point Method also uses the Basic Method. In the Single Boundary Point Method, the step of making a determination as to whether the geographic point is located within the selected region is made by drawing a line of predetermined slope through the geographic point and through the selected region. After the line is drawn, a check is made to determine whether the line intersects the selected region at the geographic point. If the line intersects the boundary of the selected region at the geographic point, then the determination is that the geographic point is located within the selected region.

A variation of the Single Boundary Point Method may include checking whether the line intersects the selected region at the geographic point only. If the line intersects the selected region at the geographic point only, then the determination is that the geographic point is located within the selected region.

Figure 9:
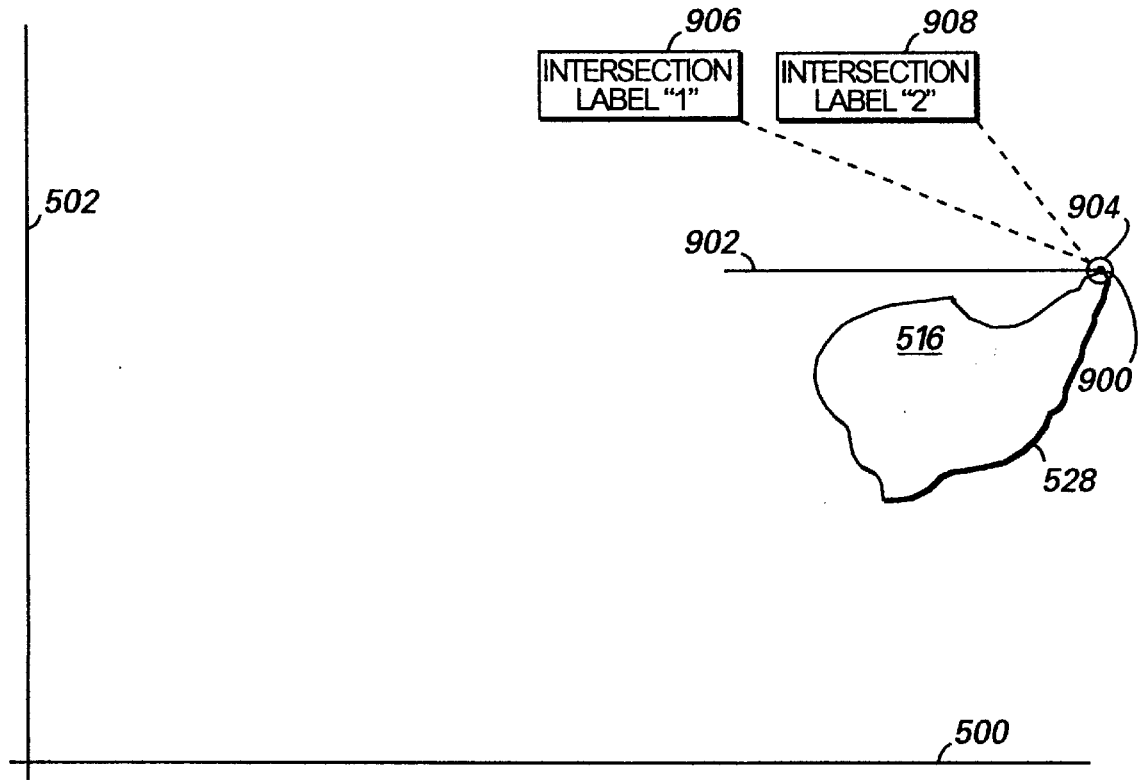
FIG. 9 illustrates the geographic region of FIG. 7 and an intersection point between a line with predetermined slope and the boundary of the geographic region.

Aspects of the Single Boundary Point Method are illustrated by reference to FIG. 9. FIG. 9 illustrates the Single Boundary Point Method using geographic point 900. In FIG. 9, geographic region 516 is selected as the selected region. Preferably, a straight line 902 of predetermined slope is drawn through the geographic point 900. In the preferred embodiment, the line 902 is horizontal and has a slope of zero. The comments regarding the slope of the line made in connection with the description of the Boundary Point Pair Method are also applicable to the Single Boundary Point Method.

The steps for making a determination as to whether the geographic point is located within the geographic region for the Single Boundary Point Method are similar to the steps described above in connection with the Boundary Point Pair Method. A table of boundary sides is created to identify intersecting sides. In this method, the latitude for one of the boundary points of an intersecting side equals the latitude for the line so two intersecting sides with a common endpoint are identified. The common endpoint is identified as an intersection point. Although the intersection point table generally contains one entry for each intersection point, under these conditions two entries may be created for a single intersection point. One entry is created if the direction of the slopes of the adjacent intersecting sides are the same. Two entries are created if the directions of the slopes of the adjacent intersecting sides are different. The directions of the slopes of the adjacent intersecting sides are different if the line with predetermined slope is tangential to the intersection point and does not intersect an immediately adjacent boundary point of the selected region. If the intersection point is entered in the table once, then the intersection point is assigned one intersection label. If the intersection point is entered in the table twice, then the intersection point is assigned two consecutive intersection labels.

The steps for making a determination as to whether the geographic point is located within the geographic region may be illustrated by FIG. 9. In FIG. 9, the line 902 intersects the boundary 528 of the selected region 516 at intersection point 904. In this example, two entries in the intersection point table are created for intersection point 904 because the direction of the slopes of the adjacent intersection sides are different. In other words, the line with predetermined slope is tangential to the intersection point and does not intersect an immediately adjacent boundary point of the selected region.

The intersection point table for the example illustrated by FIG. 9 is shown in Table 4. The intersection labels are shown graphically in FIG. 9. Intersection point 904 is labeled with two intersection labels "1" 906 and intersection label "2" 908 because the line 902 is tangential to the intersection point 904 and does not intersect an immediately adjacent boundary point of the selected region 516. In this example, the longitude for the geographic point is equal to the longitude for the intersection points so the determination is that the geographic point is located within the selected region.

TABLE 4

| Intersection Label | Intersection Point Coordinates |
|---|---|
| 1 | $(X_{904}, Y_{904})$ |
| 2 | $(X_{904}, Y_{904})$ |

In the Single Boundary Point Method, the line may not intersect the boundary of the selected region at the geographic point. If the line does not intersect the boundary of the selected region at the geographic point, then preferably the determination is that the geographic point is not located within the selected region.

In the Boundary Point Pair Method and the Single Boundary Point Method, if the determination is that the geographic point is located within the selected region, then the selected region is identified. If each geographic region has a name, then the step of identifying the selected region preferably includes identifying the selected region by the name of the selected region. Ways of identifying a selected region other than by name, such as by number or the longitude and latitude of the centroid of the selected region, will occur to those skilled in the art.

In the Boundary Point Pair Method and the Single Boundary Point Method, if the determination is that the geographic point is not located within the selected region, then preferably, another one of the geographic regions is selected as the selected region and a determination is made as to whether the geographic point is located within that selected region. The step of selecting one of the geographic regions as a selected geographic region and the step of making a determination as to whether the geographic point is located within the geographic region are preferably repeated until the determination as to whether the geographic point is located within the selected region is that the geographic point is located within the selected region. In this manner, the geographic region which contains a geographic point is identified.

Preferred Methods for Identifying the Geographic Region Which Contains a Geographic Point Using Estimated Geographic Regions One group of preferred methods uses estimated geographic regions to identify the geographic region which contains a geographic point. Estimated geographic regions are used because it may be faster and easier to determine whether the geographic point is located within an estimated geographic region than to determine whether the geographic point is located within a geographic region.

Figure 10:
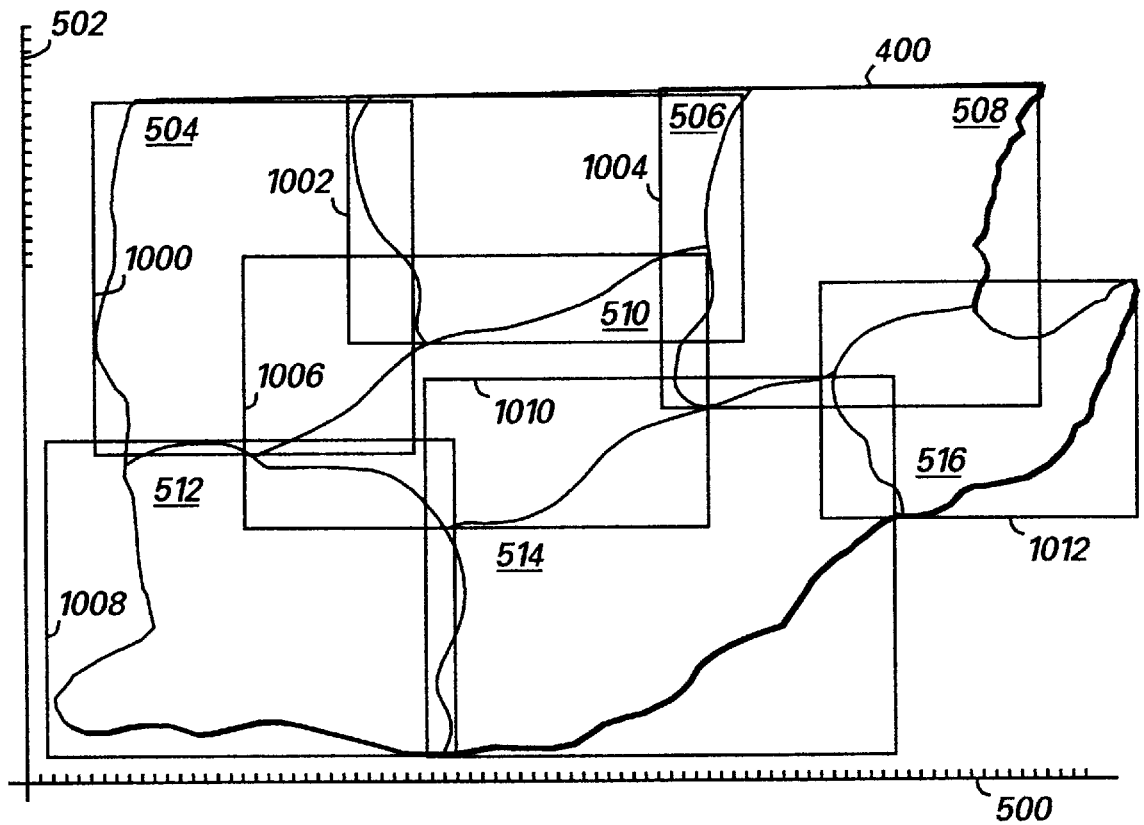
FIG. 10 illustrates the geographic area of FIG. 4 divided into geographic regions, each geographic region with a corresponding estimated geographic region.

Estimated geographic regions are illustrated by the figures. FIG. 10 shows the geographic area 400 divided into a plurality of non-overlapping geographic regions 504, 506, 508, 510, 512, 514, and 516. Each of these geographic regions is estimated by a corresponding estimated geographic region 1000, 1002, 1004, 1006, 1008, 1010, and 1012. As shown in FIG. 10, an estimated geographic region may estimate the corresponding geographic region with a regular-shaped region. A regular-shaped region is generally a symmetrical region with well-known geometric properties. For example, FIG. 10 shows rectangular-shaped estimated geographic regions. Each of the rectangular-shaped estimated geographic regions totally encompasses the corresponding geographic region. In the preferred embodiment, rectangular-shaped estimated geographic regions are used because they are easy to construct and information regarding them is easy to store. For example, only two longitudinal coordinates and two latitudinal coordinates are needed to describe a rectangular-shaped estimated geographic region. In addition, rectangular-shaped estimated geographic regions simplify the determination as to whether the geographic point is located within the selected estimated region. As will be apparent to those skilled in the art, other shapes and sizes could be used for the estimated geographic regions. Although the geographic regions are non-overlapping, the estimated geographic regions may overlap.

The preferred methods which use estimated geographic regions follow the overall method of the Basic Method. The methods in the group which use estimated geographic regions expand the step of selecting a geographic region as a selected region. In the group of preferred methods using estimated geographic regions, the step of selecting a geographic region as a selected region further comprises dividing the geographic area into a plurality of non-overlapping geographic regions, each geographic region having a respective estimated geographic region, selecting an estimated geographic region as the selected estimated region, and making a determination as to whether the geographic point is located within the selected estimated region. The selection of an estimated geographic region as the selected estimated region may be arbitrary or may be based on some type of hierarchy. For example, if the geographic area is divided into geographic regions representing BTA's, the estimated geographic region for the BTA last identified as containing a geographic point or for the BTA most often identified as containing a geographic point may be selected.

If the determination is that the geographic point is located within the selected estimated region, then the geographic region corresponding to the selected estimated region is selected as the selected region. With respect to the step of making a determination as to whether the geographic point is located within the selected region, the group of preferred methods which use estimated geographic regions is similar to the group of preferred methods which do not use estimated geographic regions described above.

Boundary Point Pair Method Using Estimated Geographic Regions

The first method for identifying the geographic region which contains a geographic point using estimated geographic regions described herein is referred to as the Boundary Point Pair Method Using Estimated Geographic Regions for ease of reference. The Boundary Point Pair Method Using Estimated Geographic Regions follows the overall method of the Basic Method. In this preferred method, the step of selecting a geographic region as the selected region includes the steps of dividing the geographic area into a plurality of non-overlapping geographic regions, selecting an estimated geographic region as the selected estimated region, making a determination as to whether the geographic point is located within the selected estimated region, and if the geographic point is located within the selected estimated region, then selecting the corresponding geographic region as the selected region.

After a geographic region is selected as the selected region, a determination is made as to whether the geographic point is located within the selected region. In the Boundary Point Pair Method Using Estimated Geographic Regions, the step of making a determination as to whether the geographic point is located within the selected region is similar to that of the Boundary Point Pair Method. The determination as to whether the geographic point is located within the selected region is made by drawing a line of predetermined slope through the geographic point and through the selected region so that the line intersects the boundary of the selected region at a first boundary point and at a second boundary point. If the geographic point lies on the line between the first boundary point and the second boundary point, then the determination is that the geographic point is located within the selected region.

Figure 11:
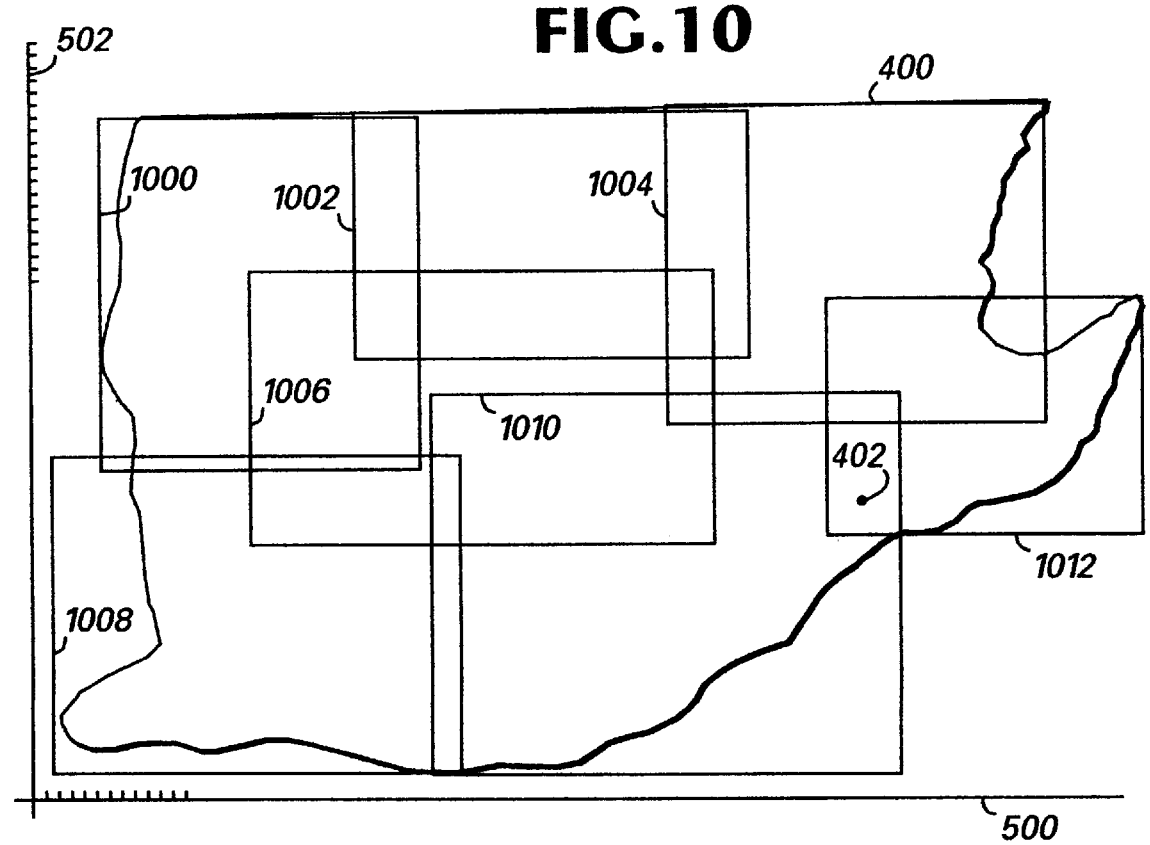
FIG. 11 illustrates the geographic area of FIG. 4 including estimated geographic regions and a geographic point.

The Boundary Point Pair Method Using Estimated Geographic Regions is illustrated by reference to FIGS. 4, 6, 10 and 11. FIG. 4 shows the geographic area 400 and a geographic point 402 located in the geographic area. In FIG. 10, the geographic area of FIG. 4 is divided into a plurality of non-overlapping geographic regions 504, 506, 508, 510, 512, 514, and 516. In FIG. 10, each of these geographic regions is estimated by a corresponding estimated geographic region 1000, 1002, 1004, 1006, 1008, 1010, and 1012, respectively. FIG. 11 shows the geographic point 402 and the estimated geographic regions 1000, 1002, 1004, 1006, 1008, 1010, and 1012. In this example, estimated geographic region 1010 is selected as the selected estimated region. After the selected estimated region is selected, a determination is made as to whether the geographic point 402 is located within the selected estimated region 1010. The determination as to whether the geographic point is located within the selected estimated region is made by comparing the geographic coordinates for the geographic point with the geographic coordinates for the selected estimated region. Preferably, the selected estimated region is described by two longitudinal coordinates and two latitudinal coordinates. If the latitude for the geographic point is between the two latitudinal coordinates and the longitude for the geographic point is between the two longitudinal coordinates, then the geographic point is located within the selected estimated region. In this example, the determination is that the geographic point 402 is located within the selected estimated region 1010. Therefore, the geographic region 514 corresponding to the selected estimated region 1010 is selected as the selected region.

The next step is to make a determination as to whether the geographic point 402 is located within the selected region 514. In the Boundary Point Pair Method Using Estimated Geographic Regions, the step of making a determination as to whether the geographic point is located within the selected region is similar to that described in connection with the Boundary Point Pair Method. As shown by FIG. 6, a line 600 of predetermined slope is drawn through the geographic point 402 and through the selected region 514 so that the line intersects the boundary 528 of the selected region 514 at a first boundary point 602 and at a second boundary point 604. To make a determination as to whether the geographic point 402 is located within the selected region 514, a table of boundary sides is built and a table of intersection points is built. The details of building a table of intersecting sides and building a table of intersection points are discussed above in connection with the Boundary Point Pair Method. In this example, the first boundary point 602 is labeled with intersection label "1" 606 and the second boundary point 604 is labeled with intersection label "2" 607. As discussed above, the determination is that the geographic point 402 lies on the line between the first boundary point 602 and the second boundary point 604. Thus, the determination is that the geographic point 402 is located within the selected region 514. Once the determination is made that the geographic point 402 is located within the selected region 514, no other estimated geographic regions or geographic regions are checked.

Single Boundary Point Method Using Estimated Geographic Regions

As discussed above in connection with the Single Boundary Point Method, there may be times when a geographic point is located such that a straight line drawn through the geographic point will not intersect the selected region at a first boundary point and at a second boundary point. In the group of preferred methods which use estimated geographic regions, this situation is handled by the Single Boundary Point Method Using Estimated Geographic Regions. The Single Boundary Point Method Using Estimated Geographic Regions follows the overall method of the Basic Method. This method includes the additional steps of dividing the geographic area into a plurality of non-overlapping geographic regions, selecting an estimated geographic region as the selected estimated region and making a determination as to whether the geographic point is located within the selected estimated region in the step of selecting a geographic region as the selected region.

In the Single Boundary Point Method Using Estimated Geographic Regions, the step of making a determination as to whether the geographic point is located within the selected region is similar to that of the Single Boundary Point Method. The determination as to whether the geographic point is located within the selected region is made by drawing a straight line of predetermined slope through the geographic point and through the selected region. The determination includes checking whether the line intersects the selected region at the geographic point. If the line intersects the boundary of the selected region at the geographic point, then the determination is that the geographic point is located within the selected region. A variation of the Single Boundary Point Method Using Estimated Geographic Regions may include checking whether the line intersects the selected region at the geographic point only. If the line intersects the selected region at the geographic point only, then the determination is that the geographic point is located within the selected region.

In the group of preferred methods which use estimated geographic regions, if the determination is that the geographic point is not located within the selected estimated region, then preferably, another one of the estimated geographic regions is selected as the selected estimated region. Once another estimated geographic region is selected as the selected estimated region, the next step is to make a determination as to whether the geographic point is located within that selected estimated region.

In the Boundary Point Pair Method Using Estimated Geographic Regions and the Single Boundary Point Method Using Estimated Geographic Regions, if the determination is that the geographic point is not located within the selected region, the step of operating upon the determination preferably includes selecting another estimated geographic region as the selected estimated region. Once the selected estimated region is selected, the following steps are repeated until the geographic point is located within the selected region: (1) the step of making a determination as to whether the geographic point is located within the selected estimated region; (2) if the geographic point is located within the selected estimated region, the step of selecting the corresponding geographic region as a selected region; and (3) the step of making a determination as to whether the geographic point is located within the selected region. In this manner, the geographic region which contains the geographic point is identified.

The steps referenced in the immediately preceding paragraph are illustrated by FIGS. 8 and 11 using geographic point 402. Referring to FIG. 11, estimated geographic region 1012 is selected as the selected estimated region. To determine whether the geographic point 402 is located within the selected estimated region 1012, the longitude and latitude for the geographic point 402 are compared with the longitude and latitude for the selected estimated region 1012. If the longitudinal coordinate for the geographic point is located between the longitudinal coordinates for the selected estimated region and the latitudinal coordinate for the geographic point is located between the latitudinal coordinates for the selected estimated region, then the geographic point is located within the selected estimated region. In this example, the longitudinal coordinate for the geographic point 402 is located between the longitudinal coordinates for the selected estimated region 1012 and the latitudinal coordinate for the geographic point 402 is located between the latitudinal coordinates for the selected estimated region 1012 so the determination is that the geographic point 402 is located within the selected estimated region 1012.

Once the determination is made that the geographic point 402 is located within the selected estimated region 1012, the corresponding geographic region 516 is selected as the selected region. FIG. 8 shows the step of making a determination as to whether the geographic point 402 is located within the selected region 516. As shown in FIG. 8, a line 600 of predetermined slope is drawn through the geographic point 402 and through the selected region 516 such that the line intersects the boundary of the selected region at a first intersection point 802 and at a second intersection point 804. As described above in connection with the Boundary Point Pair Method, the geographic point 402 is not located within the selected region 516. Based upon the determination that the geographic point 402 is not located within the selected region 516, another estimated geographic region is selected as the selected estimated region.

If estimated geographic region 1010 is selected as the selected estimated region, then, as described in connection with the Boundary Point Pair Method Using Estimated Geographic Regions, the determination is that the geographic point 402 is located within the selected estimated region 1010. Based upon the determination that the geographic point 402 is located within the selected estimated region 1010, the corresponding geographic region 514 is selected as the selected region. The step of making a determination as to whether the geographic point 402 is located within the selected region 514 is then repeated. As previously described, the determination is that the geographic point 402 is located within the selected region 514.

In the group of preferred methods using estimated geographic regions, if the determination is that the geographic point is located within the selected region, the step of operating upon the determination may include identifying the selected region. If each geographic region has a name, then the step of identifying the selected region, preferably includes identifying the selected region by the name of the selected region. Other ways of identifying the geographic region which contains a geographic point will be apparent to those skilled in the art.

Advantageously, the estimated geographic regions are used in the present invention to decrease the time necessary to identify the geographic region which contains a geographic point. In the preferred embodiment, the estimated geographic regions are regular-shaped. Each estimated geographic region totally encompasses a corresponding geographic region. It is faster to make a determination as to whether a geographic point is located within a regular-shaped estimated geographic region than to make a determination as to whether a geographic point is located within an irregular-shaped geographic region. The use of estimated geographic regions where each estimated geographic region totally encompasses a corresponding geographic region insures that the determination as to whether the geographic point is located within the estimated geographic region is that the geographic point is located within the estimated geographic region whenever the geographic point is located within the corresponding geographic region. If an estimated geographic region does not totally encompass a corresponding geographic region, then the determination may be that the geographic point is not located within the estimated geographic region even though the geographic point is located within the corresponding geographic region.

Figure 12:
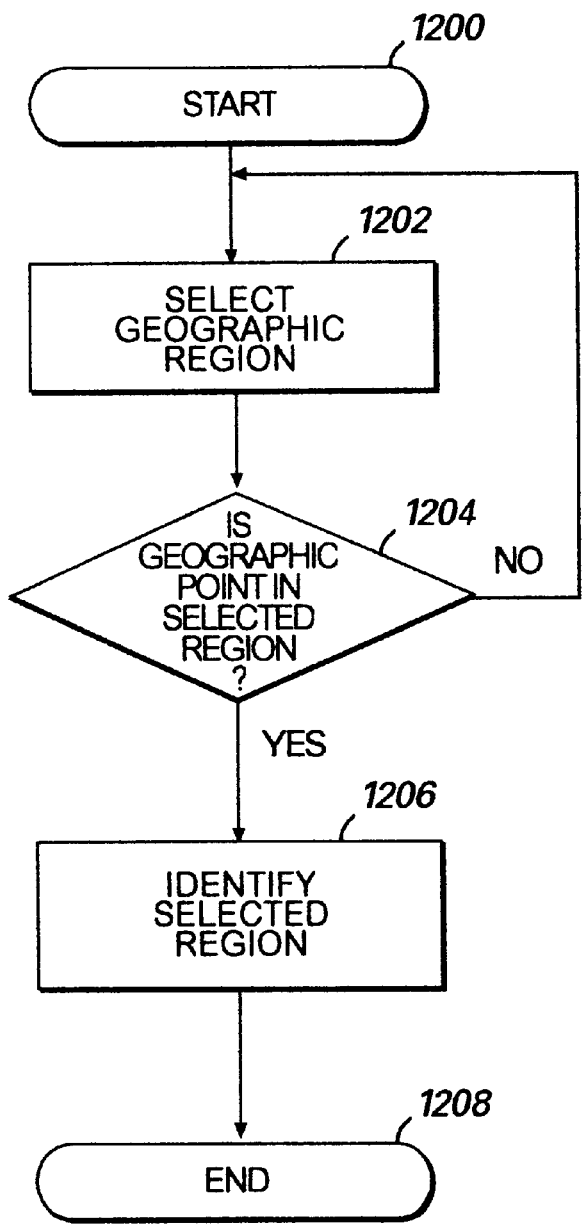
FIG. 12 is a flow diagram illustrating the preferred method for identifying the geographic region of a geographic area which contains a geographic point.

Flow Diagrams for the Preferred Methods for Identifying the Geographic Region which Contains a Geographic Point
Basic Method The common basic method shared by the preferred methods of identifying the geographic region which contains a geographic point, the Basic Method, is shown in FIG. 12. The method begins at step 1200 with the receipt of a geographic point. The method then proceeds to step 1202 where one of the geographic regions is selected as the selected region. In step 1204, a determination is made as to whether the geographic point is located within the selected region. If the geographic point is located within the selected geographic region, then the selected geographic region is identified in step 1206 and the method ends at step 1208. If the geographic point is not located within the selected geographic region in step 1204, then another geographic region is selected. Geographic regions continue to be selected until the geographic region which contains the geographic point is identified.

Selection of a Geographic Region as the Selected Region

Figure 13:
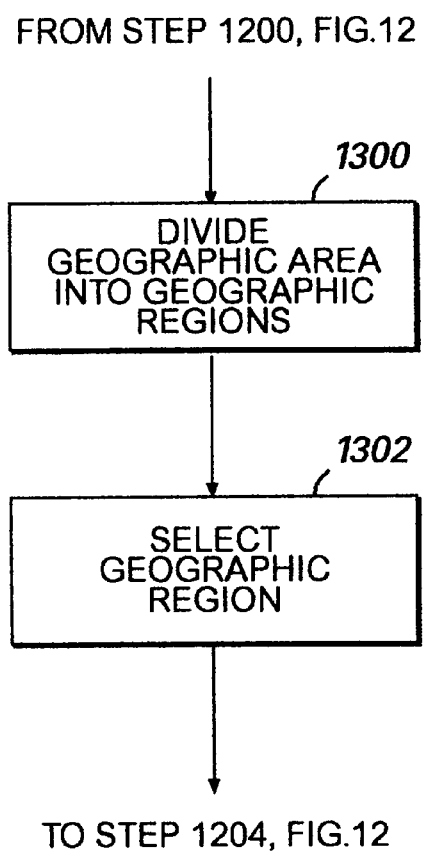
FIG. 13 is a flow diagram illustrating one of the preferred methods for selecting a geographic region.

As described in the Boundary Point Pair Method Using Estimated Geographic Regions and the Single Boundary Point Method Using Estimated Geographic Regions above, the step of selecting a geographic region as a selected region may include the additional step of dividing the geographic area into geographic regions as shown in FIG. 13. The geographic area is divided into geographic regions in step 1300 of FIG. 13. Alternatively, as in the Boundary Point Pair Method and the Single Boundary Point Method, the geographic area may be divided into geographic regions before the method begins.

In addition to dividing the geographic area into geographic regions, the Boundary Point Pair Method Using Estimated Geographic Regions and the Single Boundary Point Method Using Estimated Geographic Regions use estimated geographic regions to select one of the geographic regions as a selected region. FIG. 14 illustrates the step of selecting one of the geographic regions as a selected region when a preferred method using estimated geographic regions is used. In step 1400, one of the estimated geographic regions is selected as the selected estimated region. Next, in step 1402, a determination is made as to whether the geographic point is located within the selected estimated region. If the geographic point is located within the selected estimated region, then the corresponding geographic region is selected as the selected region in step 1404. If the geographic point is not located within the selected estimated region, then another estimated geographic region is selected as the selected estimated region in step 1400. After the selected estimated region is selected, step 1402 of making a determination as to whether the geographic point is located within the selected estimated region is repeated. Steps 1400 and 1402 are repeated until the geographic point is located in the selected estimated region.

Determination as to Whether a Geographic Point is Located in the Selected Region The step of making a determination as to whether the geographic point is located within the selected region is common to all the preferred methods and is shown as step 1204 in FIG. 12. The preferred methods provide different ways to make a determination as to whether the geographic point is located within the selected region. The alternatives used by the different methods are shown in FIGS. 15, 16 and 17.

FIG. 15 illustrates step 1204 as described in the Boundary Point Pair Method and the Boundary Point Pair Method Using Estimated Geographic Regions. In step 1500 of FIG. 15, a straight line of predetermined slope is drawn through the geographic point. A determination is made as to whether the line of predetermined slope intersects the boundary of the selected region in step 1502. If the line does not intersect the boundary of the selected region, then another geographic region is selected as the selected region. Geographic regions continue to be selected as the selected region until the line intersects the boundary of the selected region. If the line intersects the boundary of the selected region, then the method proceeds to step 1504. In step 1504, a determination is made as to whether the geographic point is located between the first boundary point and the second boundary point. If the geographic point lies on the line between the first boundary point and the second boundary point, then the geographic point is located within the selected region. If the geographic point does not lie on the line between the first boundary point and the second boundary point, then steps 1202 and 1204 are repeated until the geographic point is located within the selected region.

Figure 16:
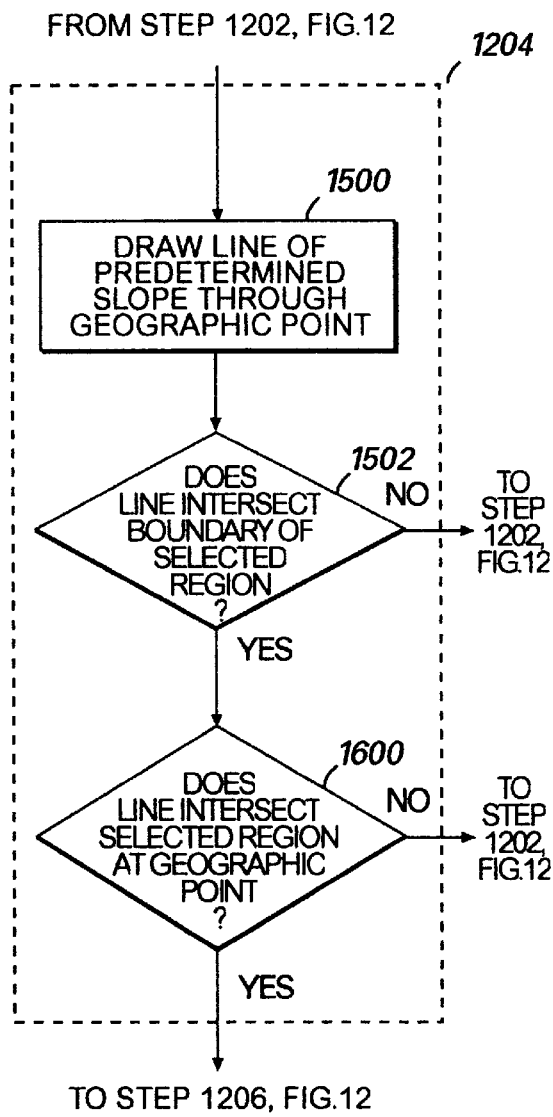
FIG. 16 is a flow diagram illustrating one of the preferred methods for determining whether a geographic point is located within a selected region.

Another alternative for step 1204 is shown in FIG. 16 and is described by the Single Boundary Point Method and the Single Boundary Point Method Using Estimated Geographic Regions. In step 1500 a line of predetermined slope is drawn through the geographic point. A determination is made as to whether the line of predetermined slope intersects the boundary of the selected region in step 1502. If the line does not intersect the boundary of the selected region, then another geographic region is selected. Steps 1202, 1500, and 1502 are repeated until the line intersects the boundary of the selected region. If the line intersects the boundary of the selected region, then in step 1600 a determination is made as to whether the line intersects the boundary of the selected region at the geographic point. If the line intersects the boundary of the selected region at the geographic point, the geographic point is located within the geographic region. If the line does not intersect the boundary of the selected region at the geographic point, the geographic point is not located within the selected region and steps 1202 and 1204 are repeated until the geographic point is located within the selected region.

Figure 17:
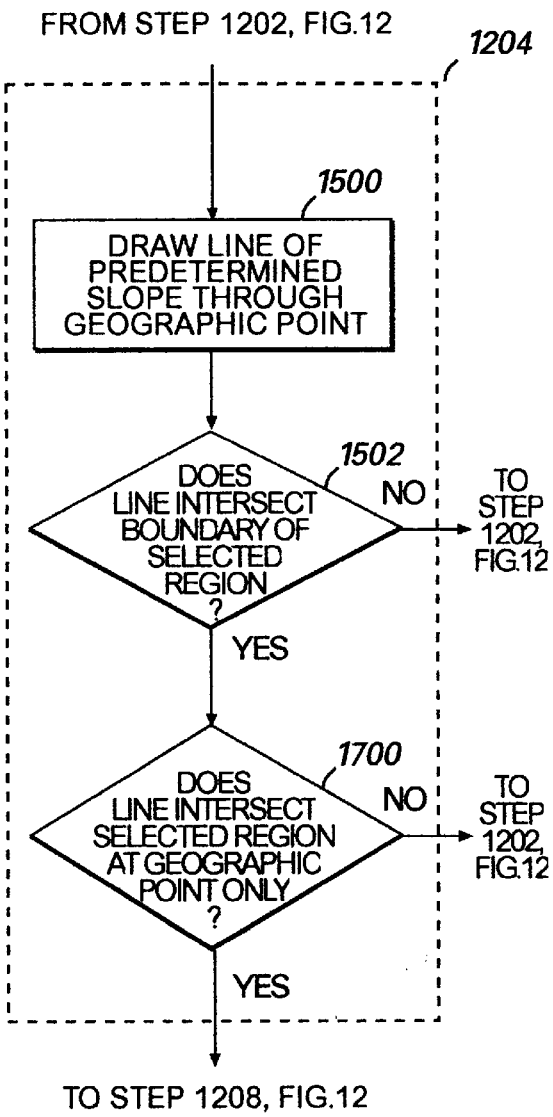
FIG. 17 is a flow diagram illustrating one of the preferred methods for determining whether a geographic point is located within a selected region.

FIG. 17 illustrates a variation of step 1204 for the Single Boundary Point Method and the Single Boundary Point Method Using Estimated Geographic Regions. A line of predetermined slope is drawn through the geographic point in step 1500. A determination is made as to whether the line of predetermined slope intersects the boundary of the selected region in step 1502. If the line does not intersect the boundary of the selected region, then another geographic region is selected in step 1202 and steps 1500 and 1502 are repeated. Steps 1202, 1500, and 1502 are repeated until the line intersects the boundary of the selected region. In step 1700, a determination is made as to whether the line intersects the boundary of the selected region only at the geographic point. If the line intersects the boundary of the selected region only at the geographic point, then the geographic point is located within the selected region. If the line does not intersect the boundary of the selected region only at the geographic point, then steps 1202 and 1204 are repeated until the geographic point is located within the selected region.

In conclusion, the present invention is a system and method for identifying the geographic region of a geographic area which contains a geographic point associated with a location. The present invention has been described in relation to particular embodiments which are intended in all respects to be illustrative rather than restrictive. Alternative embodiments will become apparent to those skilled in the art to which the present invention pertains without departing from its spirit and scope. Accordingly, the scope of the present invention is defined by the appended claims rather than the foregoing description.

What is claimed is:

1. A method for identifying geographic coordinates for a geographic point associated with a location, comprising the steps of:

A. receiving an address for said location, said address having a zip code;
   B. receiving an address match candidate, said address match candidate corresponding to a first geographic point;
   C. making an address determination as to whether said address match candidate is associated with said location;
   D. if said address determination determines that said address match candidate is not associated with said location, then receiving an intersection near said location;
   E. receiving an intersection match candidate, said intersection match candidate corresponding to a second geographic point;
   F. making an intersection determination as to whether said intersection match candidate is associated with said location;
   G. if said intersection determination determines that said intersection match candidate is not associated with said location, then receiving a landmark near said location;
   H. receiving a landmark match candidate, said landmark match candidate corresponding to a third geographic point;
   I. making a landmark determination as to whether said landmark match candidate is associated with said location;
   J. if said landmark determination determines that said landmark match candidate is not associated with said location, then receiving a fourth geographic point associated with said zip code, said fourth geographic point having geographic coordinates associated with said location; and
   K. identifying the geographic coordinates for the fourth geographic point.

2. The method of claim 1, further comprising the step of:
   if said address determination is that said address match candidate is associated with said location, then identifying geographic coordinates for said first geographic point.

3. The method of claim 1, further comprising the step of:
   if said intersection determination is that said intersection match candidate is associated with said location, then identifying geographic coordinates for said second geographic point.

4. The method of claim 1, further comprising the step of:
if said landmark determination is that said landmark match candidate is associated with said location, then identifying geographic coordinates for said third geographic point.

5. The method of claim 1, wherein said zip code defines a geographic region having a centroid, and wherein said step of identifying geographic coordinates for a fourth geographic point associated with said zip code further comprises:
identifying geographic coordinates corresponding to said centroid of said zip code zone.

6. A method for identifying geographic coordinates for a geographic point associated with an address, comprising the steps of:
A. receiving an address, said address having a street number;
B. making an address match candidate determination as to whether there is an address match candidate associated with said address, said address match candidate corresponding to a first geographic point;
C. if said address match candidate determination determines that there is no address match candidate associated with said address, then deleting said street number from said address to create a modified address;
D. receiving a modified address match candidate, said modified address match candidate corresponding to a second geographic point;
E. making a modified address determination as to whether said modified address match candidate is associated with said location;
F. if said modified address determination determines that said modified address match candidate is associated with said location, then receiving geographic coordinates for said second geographic point; and
G. identifying the geographic coordinates for the second geographic point.

7. The method of claim 6, wherein said address has a zip code, further comprising the step of:
if said modified address determination is that said modified address match candidate is not associated with said location, then identifying geographic coordinates for a third geographic point associated with a zip code for said address.

8. A computer-readable medium on which is stored a computer program for identifying geographic coordinates for a geographic point associated with a location, comprising instructions which, when executed by a computer, perform the steps of:
A. receiving an address for said location, said address including a street number and a zip code;
B. making an address match candidate determination as to whether there is an address match candidate associated with said address, said address match candidate corresponding to a first geographic point;
C. if said address match candidate determination determines that there is no address match candidate associated with said address, then deleting said street number from said address to create a modified address;
D. receiving a modified address match candidate, said modified address match candidate corresponding to a second geographic point;
E. making a modified address determination as to whether said modified address match candidate is associated with said location;
F. if said modified address determination determines that said modified address match candidate is not associated with said location, then receiving an intersection near the location;
G. receiving an intersection match candidate, said intersection match candidate corresponding to a third geographic point;
H. making an intersection determination as to whether said intersection match candidate is associated with said location;
I. if said intersection determination determines that said intersection match candidate is not associated with said location, then receiving a landmark near the location;
J. receiving a landmark match candidate, said landmark match candidate corresponding to a fourth geographic point;
K. making a landmark determination as to whether said landmark match candidate is associated with said location; and
L. if said landmark determination determines that said landmark match candidate is not associated with said location, then identifying geographic coordinates for a fifth geographic point associated with said zip code.

9. The computer-readable medium of claim 8, further comprising:
if said address match candidate determination is that there is an address match candidate associated with said address, then
(a) receiving said address match candidate; and
(b) making an address determination as to whether said address match candidate is associated with said location.

10. The computer-readable medium of claim 8, wherein said zip code defines a zip code zone having a centroid, and wherein said step of identifying geographic coordinates for a geographic point associated with said zip code further comprises:
identifying geographic coordinates for a geographic point corresponding to said centroid of said zip code zone.

11. In a geographic area divided into a plurality of non-overlapping geographic regions, a method for identifying the geographic region which contains a geographic point, comprising the steps of:
A. selecting one of said plurality of non-overlapping geographic regions as a selected region, said selected region being defined by a boundary of a plurality of boundary points;
B. making a determination as to whether said geographic point is located within said selected region by
drawing a line of predetermined slope through said geographic point and through said selected region so that said line intersects a first boundary point of said selected region and a second boundary point of said selected region,
checking whether said geographic point lies on said line between said first boundary point and said second boundary point, and if said geographic point lies on said line between said first boundary point and said second boundary point, then defining said determination to be that said geographic point is located within said selected region; and
C. if said determination determines that said geographic point is located within said selected region, then identifying said selected region.

12. The method of claim 11, wherein said step B further comprises:

if said geographic point does not lie on said line between said first boundary point and said second boundary point, then defining said determination to be that said geographic point is not located within said selected region.

13. In a geographic area divided into a plurality of non-overlapping geographic regions, a method for identifying the geographic region which contains a geographic point, comprising the steps of:

A. selecting one of said plurality of non-overlapping geographic regions as a selected region, said selected region being defined by a boundary of a plurality of boundary points;

B. making a determination as to whether said geographic point is located within said selected region by drawing a line of predetermined slope through said geographic point, checking whether said line intersects said selected region at said geographic point, and if said line intersects said selected region at said geographic point, then defining said determination to be that said geographic point is located within said selected region; and C. if said determination determines that said geographic point is located within said selected region, then identifying said selected region.

14. The method of claim 13, wherein said step B further comprises:

if said line does not intersect said selected region at said geographic point, then defining said determination to be that said geographic point is not located within said selected region.

15. The method of claim 13, wherein said step B further comprises:

checking whether said line intersects said selected region at said geographic point only.

16. The method of claims 11 or 13 wherein each geographic region of said plurality of non-overlapping geographic regions has a name, and wherein said step C further comprises identifying said selected region by the name of said selected region.

17. The method of claims 12 or 14 wherein said determination in said step B is that said geographic point is not located within said selected region, and wherein said step B further comprises:

repeating said step A followed by said step B with another one of said plurality of non-overlapping geographic regions as said selected region until said determination in said step B changes to be that said geographic point is located within said selected region.

18. A method for identifying the geographic region of a geographic area which contains a geographic point, comprising the steps of:

A. dividing said geographic area into a plurality of non-overlapping geographic regions, each of said non-overlapping geographic regions corresponding to a respective estimated geographic region so as to provide a plurality of estimated geographic regions;

B. selecting one of said plurality of estimated geographic regions as a selected estimated region;

C. making a first determination as to whether said geographic point is located within said selected estimated region;

D. if said geographic point is located within said selected estimated region, then selecting a selected region, said selected region being the geographic region of said plurality of non-overlapping geographic regions that corresponds to said selected estimated region, and said selected region being defined by a boundary of a plurality of boundary points;

E. making a second determination as to whether said geographic point is located within said selected region by drawing a line of predetermined slope through said geographic point and through said selected region so that said line intersects a first boundary point of said selected region and a second boundary point of said selected region, checking whether said geographic point lies on said line between said first boundary point and said second boundary point, and if said geographic point lies on said line between said first boundary point and said second boundary point, then defining said second determination to be that said geographic point is located within said selected region; and F. if said second determination determines that said geographic point is located within said selected region, then identifying said selected region.

19. A method for identifying the geographic region of a geographic area which contains a geographic point, comprising the steps of:

A. dividing said geographic area into a plurality of non-overlapping geographic regions, each of said non-overlapping geographic regions corresponding to a respective estimated geographic region so as to provide a plurality of estimated geographic regions;

B. selecting one of said plurality of estimated geographic regions as a selected estimated region;

C. making a first determination as to whether said geographic point is located within said selected estimated region;

D. if said geographic point is located within said selected estimated region, then selecting a selected region, said selected region being the geographic region of said plurality of non-overlapping geographic regions that corresponds to said selected estimated region, and said selected region being defined by a boundary of a plurality of boundary points;

E. making a second determination as to whether said geographic point is located within said selected region by drawing a line of predetermined slope through said geographic point, checking whether said line intersects said selected region at said geographic point, and if said line intersects said selected region at said geographic point, then defining said second determination to be that said geographic point is located within said selected region; and F. if said second determination determines that said geographic point is located within said selected region, then identifying said selected region.

20. The method of claim 19, wherein step E further comprises:

checking whether said line intersects said selected region at said geographic point only.

21. The method of claims 18 or 19 further comprising:

if said second determination in said step E determines that said geographic point is not located within said selected region, then repeating said steps B, C, D and E with another one of said plurality of estimated geographic regions as said selected estimated region until said second determination in said step E is that said geographic point is located within said selected region.

22. The method of claims 18 or 19, further comprising the step of:

if said geographic point is not located within said estimated geographic region, then repeating said step B followed by said step C with another one of said plurality of estimated geographic regions as said selected estimated region.

23. The method of claims 18 or 19 wherein each region of said plurality of non-overlapping geographic regions has a name, and wherein said step of identifying said selected region further comprises identifying said selected region by the name of said selected region.

24. The method of 18 or 19 wherein each of said estimated geographic regions of said step A, totally encompasses each of said corresponding non-overlapping geographic regions.

25. A computer-readable medium on which is stored a computer program for identifying the geographic region of a geographic area which contains a geographic point comprising instructions which, when executed by a computer, perform the steps of:

A. dividing said geographic area into a plurality of non-overlapping geographic regions;

B. selecting one of said plurality of non-overlapping geographic regions as a selected region, said selected region being defined by a boundary of a plurality of boundary points;

C. making a determination as to whether said geographic point is located within said selected region by drawing a line of predetermined slope through said geographic point and through said selected region so that said line intersects a first boundary point of said selected region and a second boundary point of said selected region, checking whether said geographic point lies on said line between said first boundary point and said second boundary point, if said geographic point lies on said line between said first boundary point and said second boundary point, then defining said determination to be that said geographic point is located within said selected region, and if said geographic point does not lie on said line between said first boundary point and said second boundary point, then defining said determination to be that said geographic point is not located within said selected region; and D. if said determination determines that said geographic point located within said selected region, then identifying said selected region.

26. The computer readable medium of claim 25, wherein said step C further comprises the steps of:

if said determination in said step C determines that said geographic point is not located within said selected region, then repeating said steps B and C with another one of said plurality of estimated geographic regions as said selected estimated region until said determination in said step C is that said geographic point is located within said selected region.

27. The computer readable medium of claim 25, wherein each region of said plurality of non-overlapping geographic regions has a name, and wherein said step of identifying said selected region further comprises identifying said selected region by the name of said selected region.

28. A computer-readable medium on which is stored a computer program for identifying the geographic region of a geographic area which contains a geographic point associated with a location, said geographic area being divided into a plurality of geographic regions, comprising instructions which, when executed by a computer, perform the steps of:

A. receiving an address for said location;

B. making an address determination as to whether said address is associated with an address match candidate, said address match candidate corresponding to a first geographic point;

C. if said address determination determines that said address is associated with said address match candidate, then selecting said first geographic point as said selected geographic point;

D. selecting one of said plurality of non-overlapping geographic regions as a selected region, said selected region being defined by a boundary of a plurality of boundary points;

E. making a determination as to whether said selected geographic point is located within said selected region by drawing a line of predetermined slope through said selected geographic point and through said selected region so that said line intersects a first boundary point of said selected region and a second boundary point of said selected region, and checking whether said selected geographic point lies on said line between said first boundary point and said second boundary point;

F. if said selected geographic point lies on said line between said first boundary point and said second boundary point, then defining said determination to be that said selected geographic point is located within said selected region; and G. if said determination determines that said selected geographic point is located within said selected region, then identifying said selected region.

29. The computer readable medium of claim 28, further comprising the steps of:

H. if said address determination is that said address is not associated with said address match candidate, then receiving an intersection;

I. receiving an intersection match candidate, said intersection match candidate corresponding to a second geographic point;

J. making an intersection determination as to whether said address is associated with an intersection match candidate;

K. if said intersection determination is that said address is not associated with said intersection match candidate, then receiving a landmark;

L. receiving a landmark match candidate, said landmark match candidate corresponding to a third geographic point;

M. making a landmark determination as to whether said address is associated with a landmark match candidate; and N. if said landmark determination is that said address is not associated with said landmark match candidate, then selecting a fourth geographic point associated with said zip code as said selected geographic point.

30. In a coordinate system having a plurality of points, each point defined by an x-coordinate and a y-coordinate, a method for identifying which of a plurality of non-overlapping regions of an area contains one of the points, comprising the steps of:

A. selecting one of the plurality of points as a selected point;

B. selecting one of the plurality of regions as a selected region, the selected region being defined by a plurality of region boundary points; and C. determining whether the selected point is located within the selected region by:
  (1) determining whether a straight line drawn through the selected point intersects the selected region at a first boundary point and a second boundary point;
  (2) if the straight line intersects the selected region at the first boundary point and the second boundary point, then determining whether the selected point is located between the first boundary point and the second boundary point; and
  (3) if the selected point is located between the first boundary point and the second boundary point, then determining that the selected point is located within the selected region.

31. The method of claim 30, wherein the straight line is a non-vertical line, and wherein step C(1) comprises the steps of:
  (a) building a table of region boundary sides having a plurality of entries, each of the entries having a first region boundary point and a next consecutive region boundary point;
  (b) comparing the selected point to a selected one of the entries;
  (c) if the y-coordinate for the selected first region boundary point is greater than the y-coordinate for the selected point and the y-coordinate for the selected next consecutive region boundary point is less than the y-coordinate for the selected point, then determining that the straight line intersects the selected region at the first boundary point; and
  (d) if the straight line intersects the selected region at the first boundary point, then determining the x-coordinate of the first boundary point using the x-coordinate and the y-coordinate of the selected first region boundary point, the x-coordinate and the y-coordinate of the selected next consecutive region boundary point, and the y-coordinate of the selected point.

32. The method of claim 31, wherein the steps (b)–(d) are repeated for the second boundary point.

33. The method of claim 31, further comprising the step of:
  if the y-coordinate for the selected first region boundary point is not greater than the y-coordinate for the selected point or the y-coordinate for the selected next consecutive region boundary is not less than the y-coordinate for the selected point, then repeating steps (b)–(d) with a second selected one of the entries.

34. The method of claim 30, wherein step C(2) comprises:
  (a) building a table of intersection points having a first entry comprising an odd intersection label and the first boundary point and a second entry comprising an even intersection label and the second boundary point;
  (b) comparing the selected point to the first entry and the second entry; and
  (c) if the x-coordinate of the selected point is located between the x-coordinate of the first boundary point and the x-coordinate of the second boundary point, then determining that the selected point is located between the first boundary point and the second boundary point.

35. The method of claim 30, wherein the straight line is a vertical line, and wherein step C(1) comprises the steps of:
  (a) building a table of region boundary sides having a plurality of entries, each of the entries having a first region boundary point and a next consecutive region boundary point;
  (b) comparing the selected point to a selected one of the entries;
  (c) if the x-coordinate for the selected first region boundary point is greater than the x-coordinate for the selected point and the x-coordinate for the selected next consecutive region boundary point is less than the x-coordinate for the selected point, then determining that the vertical line intersects the selected region at the first boundary point; and
  (d) determining the y-coordinate of the first boundary point using the x-coordinate and the y-coordinate of the selected first region boundary point, the x-coordinate and the y-coordinate of the selected next consecutive region boundary point, and the x-coordinate of the selected point.

36. The method of claim 35, wherein the steps (b)–(d) are repeated for the second boundary point.

37. The method of claim 30, wherein step C(2) comprises:
  (a) building a table of intersection points having a first entry comprising an odd intersection label and the first boundary point and a second entry comprising an even intersection label and the second boundary point;
  (b) comparing the selected point to the first entry and the second entry; and
  (c) if the y-coordinate of the selected point is located between the first entry and the second entry, then determining that the selected point is located between the first boundary point and the second boundary point.

38. In a coordinate system having a plurality of points, each point defined by an x-coordinate and a y-coordinate, a method for identifying which of a plurality of non-overlapping regions of an area contains one of the points, comprising the steps of:

A. selecting one of the plurality of points as a selected point;

B. selecting one of the plurality of regions as a selected region, the selected region being defined by a plurality of region boundary points; and C. determining whether the selected point is located within the selected region by:
  (1) determining whether a straight line drawn through the selected point intersects the selected region only at the selected point; and
  (2) if the straight line intersects the selected region only at the selected point, then determining that the selected point is located within the selected region.

39. The method of claim 38, wherein step C(1) comprises the steps of:
  (a) building a table of region boundary sides having a plurality of entries, each of the entries having a first region boundary point and a next consecutive region boundary point;
  (b) comparing the selected point to a selected one of the entries; and
  (c) if the y-coordinate of the selected first region boundary point is equal to the y-coordinate of the selected point and the x-coordinate of the selected first region boundary point is equal to the x-coordinate of the selected point, then determining that the straight line intersects the selected region at the selected first region boundary point.

40. The method of claim 39, further comprising the steps of:
   (d) building a table of intersection points having a first entry comprising an odd intersection label and the selected first region boundary point;
   (e) if the straight line is tangential to the selected first region boundary point and the straight line does not intersect an immediately adjacent region boundary point, then creating a second entry in the table of intersection points comprising an even intersection label and the selected first region boundary point;
   (f) comparing the selected point to the first entry and the second entry; and
   (g) if the x-coordinate and the y-coordinate of the selected point is equal to the x-coordinate and the y-coordinate of the first entry and the second entry, then determining that the straight line intersects the selected region only at the selected point.

41. In a geographic area divided into a plurality of non-overlapping geographic regions, each of the geographic regions being defined by a region boundary of a plurality of region boundary points, a method for identifying the geographic region which contains a geographic point, comprising the steps of:
   A. selecting one of the plurality of non-overlapping geographic regions as a selected region;
   B. estimating the selected region with a selected estimated region;
   C. making a first determination as to whether the geographic point is located within the selected estimated region;
   D. if the geographic point is located within the selected estimated region, making a second determination as to whether the geographic point is located within the selected region; and
   E. if the second determination in step D is that the geographic point is located within the selected region, then identifying the selected region.

42. The method of claim 41, wherein if the first determination in step C is that the geographic point is not located within the selected estimated region, then
   repeating steps A, B and C with another one of the non-overlapping geographic regions until the first determination in the step C is that the estimated zone is located within the selected estimated region.

43. The method of claim 41, wherein if the second determination in step D is that the geographic point is not located within the selected region, then
   repeating steps A, B, C, and D with another one of the non-overlapping geographic regions until the second determination in step D is that the geographic point is located within the selected region.

44. The method of claim 41, wherein step D comprises the steps of:
   (1) determining whether a straight line drawn through the geographic point intersects the selected region at a first boundary point and a second boundary point;
   (2) if the straight line intersects the selected region at the first boundary point and the second boundary point, then determining whether the geographic point is located between the first boundary point and the second boundary point; and
   (3) if the geographic point is located between the first boundary point and the second boundary point, then determining that the geographic point is located within the selected region.

45. The method of claim 44, wherein the straight line is a non-vertical line, and wherein the step (1) comprises the steps of:
   (a) building a table of region boundary sides having a plurality of entries, each of the entries having a first region boundary point and a next consecutive region boundary point;
   (b) comparing the geographic point to a selected one of the entries;
   (c) if the y-coordinate for the selected first region boundary point is greater than the y-coordinate for the geographic point and the y-coordinate for the selected next consecutive region boundary point is less than the y-coordinate for the geographic point, then determining that the straight line intersects the selected region at the first boundary point; and
   (d) if the straight line intersects the selected region at the first boundary point, then determining the x-coordinate of the first boundary point using the x-coordinate and the y-coordinate of the selected first region boundary point, the x-coordinate and the y-coordinate of the selected next consecutive region boundary point, and the y-coordinate of the geographic point.

46. The method of claim 45, wherein steps (b)–(d) are repeated for the second boundary point.

47. The method of claim 44, wherein the straight line is a non-vertical line, and wherein the step (1) comprises the steps of:
   (a) building a table of region boundary sides having a plurality of entries, each of the entries having a first region boundary point and a next consecutive region boundary point;
   (b) comparing the geographic point to a selected one of the entries;
   (c) if the x-coordinate for the selected first region boundary point is greater than the x-coordinate for the geographic point and the x-coordinate for the selected next consecutive region boundary point is less than the x-coordinate for the geographic point, then determining that the straight line intersects the selected region at the first boundary point; and
   (d) if the straight line intersects the selected region at the first boundary point, then determining the y-coordinate of the first boundary point using the x-coordinate and the y-coordinate of the selected first region boundary point, the x-coordinate and the y-coordinate of the selected next consecutive region boundary point, and the x-coordinate of the geographic point.

48. The method of claim 44, wherein the step (2) comprises:
   (a) building a table of intersection points having a first entry comprising an odd intersection label and the first boundary point and a second entry comprising an even intersection label and the second boundary point;
   (b) comparing the geographic point to the first entry and the second entry; and
   (c) if the x-coordinate of the geographic point is located between the x-coordinate of the first boundary point and the x-coordinate of the second boundary point, then determining that the geographic point is located between the first boundary point and the second boundary point.

49. The method of claim 41, wherein step D comprises the steps of:
- (1) determining whether a straight line drawn through the geographic point intersects the selected region only at the geographic point; and
- (2) if the straight line intersects the selected region only at the geographic point, then determining that the geographic point is located within the selected region.

50. The method of claim 49, wherein step (1) comprises the steps of:
- (a) building a table of region boundary sides having a plurality of entries, each of the entries having a first region boundary point and a next consecutive region boundary point;
- (b) comparing the geographic point to a selected one of the entries; and
- (c) if the y-coordinate of the selected first region boundary point is equal to the y-coordinate of the geographic point and the x-coordinate of the selected first region boundary point is equal to the x-coordinate of the geographic point, then determining that the straight line intersects the selected region at the selected first region boundary point.

51. The method of claim 50, further comprising the steps of:
- (d) building a table of intersection points having a first entry comprising an odd intersection label and the selected first region boundary point;
- (e) if the straight line is tangential to the selected first region boundary point and the straight line does not intersect an immediately adjacent region boundary point, then creating a second entry in the table of intersection points comprising an even intersection label and the selected first region boundary point;
- (f) comparing the geographic point to the first entry and the second entry; and
- (g) if the x-coordinate and the y-coordinate of the geographic point is equal to the x-coordinate and the y-coordinate of the first entry and the second entry, then determining that the straight line intersects the selected region only at the geographic point.

* * * * *